US009587109B2

(12) United States Patent
Yang et al.

(10) Patent No.: US 9,587,109 B2
(45) Date of Patent: Mar. 7, 2017

(54) LOW TEMPERATURE IMPACT PROPERTIES IN PC-SILOXANE COPOLYMER BLEND WITH BLACK AND WHITE COLOR CAPACITY

(71) Applicant: SABIC Global Technologies B.V., Bergen op Zoom (NL)

(72) Inventors: Jian Yang, Shanghai (CN); Robert Dirk Van de Grampel, Tholen (NL); Mark Adrianus Johannes van der Mee, Breda (NL); Jon Michael Malinoski, Zionsville, IN (US); Niles Richard Rosenquist, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 4 days.

(21) Appl. No.: 14/425,193

(22) PCT Filed: Aug. 30, 2013

(86) PCT No.: PCT/CN2013/082706
§ 371 (c)(1),
(2) Date: Mar. 2, 2015

(87) PCT Pub. No.: WO2014/032616
PCT Pub. Date: Mar. 6, 2014

(65) Prior Publication Data
US 2015/0284564 A1    Oct. 8, 2015

Related U.S. Application Data

(60) Provisional application No. 61/695,550, filed on Aug. 31, 2012, provisional application No. 61/695,231, filed on Aug. 30, 2012.

(51) Int. Cl.
C08L 69/00    (2006.01)
C08L 83/10    (2006.01)
C08G 77/448   (2006.01)
C08K 3/22     (2006.01)

(52) U.S. Cl.
CPC ............ *C08L 69/00* (2013.01); *C08G 77/448* (2013.01); *C08L 83/10* (2013.01); *C08K 2003/2241* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 4,746,701 | A | 5/1988 | Kress et al. |
| 6,969,745 | B1 | 11/2005 | Taraiya et al. |
| 7,728,056 | B2 | 6/2010 | Kuvshinnikova et al. |
| 8,017,697 | B2 | 9/2011 | Carrillo et al. |
| 2008/0014376 | A1 | 1/2008 | Horio et al. |
| 2008/0230751 | A1 | 9/2008 | Li et al. |
| 2010/0129649 | A1* | 5/2010 | Malinoski ............ C08L 69/005 428/339 |
| 2012/0302663 | A1 | 11/2012 | Park et al. |

FOREIGN PATENT DOCUMENTS

| WO | 2004076512 A2 | 9/2004 |
| WO | 2012058821 A1 | 5/2012 |
| WO | WO2012058821 A * | 5/2012 |

OTHER PUBLICATIONS

International Search Report for International Application No. PCT/CN2013/082706; International Filing Date: Aug. 30, 2013; Date of Mailing: Dec. 5, 2013; 4 Pages.
Written Opinion of the International Searching Authority International Application No. PCT/CN2013/082706; International Filing Date: Aug. 30, 2013; Date of Mailing: Dec. 5, 2013; 13 Pages.
Extended European Search Report for European Application No. 13832089.0; Date of Search Jul. 9, 2015; Date of Mailing: Jul. 23, 2015; 4 Pages.

* cited by examiner

Primary Examiner — Tahseen N Khan
(74) Attorney, Agent, or Firm — Cantor Colburn LLP

(57) ABSTRACT

The present disclosure describes polycarbonate-siloxane blends with a constant percentage of siloxane in the formulations. The polycarbonate-siloxane blends achieve improved impact properties, as well as the ability to achieve deep black and bright white colors.

20 Claims, No Drawings

LOW TEMPERATURE IMPACT PROPERTIES IN PC-SILOXANE COPOLYMER BLEND WITH BLACK AND WHITE COLOR CAPACITY

CROSS-REFERENCE TO RELATED APPLICATIONS

This Application claims the benefit of International Application No. PCT/CN2013/082706, filed on Aug. 30, 2013 which claims the benefit of U.S. Provisional Application No. 61/695,231, filed on Aug. 30, 2012, and U.S. Provisional Application No. 61/695,550, filed on Aug. 31, 2012, which are incorporated herein by reference in their entirety.

BACKGROUND OF THE INVENTION

Previous products using standard polycarbonates do not have sufficient impact strength to reduce the rate of cracking. The standard polycarbonates also do not have the ability to achieve a deep black color and bright white colors.

Accordingly, there remains a need for compositions that have good impact properties with the ability to achieve deep black and bright white colors. This and other needs are satisfied by the various aspects of the present disclosure.

SUMMARY OF THE INVENTION

This invention relates generally to a composition with good impact properties. To that end, according to the aspects, compositions are disclosed that generally comprise a blend a polycarbonate polymer with a first polysiloxane-polycarbonate copolymer, a second polysiloxane-polycarbonate copolymer, and a color composition.

The present disclosure describes a composition with a constant percentage of siloxane in the formulations. The composition achieves improved impact properties, as well as the ability to achieve deep black and bright white colors.

In one aspect, the present disclosure describes a polycarbonate blend composition comprising: (a) a polycarbonate homopolymer; (b) a first polysiloxane-polycarbonate copolymer comprising: (i) polydiorganosiloxane blocks comprising repeating structural units of formula:

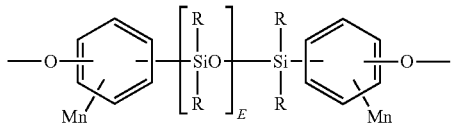

wherein the polydiorganosiloxane block length (E) is from 30 to 60; and (ii) polycarbonate blocks comprising polycarbonate units of formula:

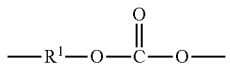

wherein at least 60 percent of the total number of $R^1$ groups comprise aromatic moieties and the balance thereof comprise aliphatic, alicyclic, or aromatic moieties; wherein the first polysiloxane-polycarbonate copolymer comprises a diorganosiloxane content of from 4 to 8 wt % diorganosiloxane based on the total weight of the first polysiloxane-polycarbonate copolymer; (c) a second polysiloxane-polycarbonate copolymer comprising: (i) polydiorganosiloxane blocks comprising repeating structural units of formula:

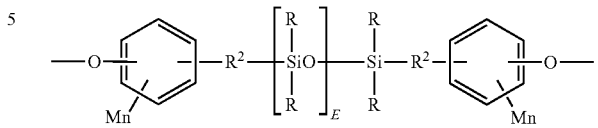

wherein the polydiorganosiloxane block length (E) is from 30 to 100; and (ii) polycarbonate blocks comprising polycarbonate units of formula:

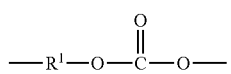

wherein at least 60 percent of the total number of $R^1$ groups comprise aromatic moieties and the balance thereof comprise aliphatic, alicyclic, or aromatic moieties; wherein the second polysiloxane-polycarbonate copolymer comprises a diorganosiloxane content of from 15 to 30 wt % diorganosiloxane based on the total weight of the second polysiloxane-polycarbonate copolymer; and (d) a colorant composition; wherein the blend composition has an average melt flow rate (MFR) of 7 or greater measured at 300° C./1.2 kg; and wherein a molded part having a thickness of 3.2 mm formed from the blend composition has a black color characterized by an average L* value of 27 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 650 J/m or greater and a % ductility of 100% according to ASTM D256-2010.

According to further aspects, disclosed are compositions that have an improved notched Izod impact strength that does not comprise the other properties of the composition.

In further aspects, disclosed are articles comprising the disclosed composition, for example an article as a component in a smart phone.

In a further aspect, the invention relates to methods of making the disclosed compositions.

Other advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

DETAILED DESCRIPTION OF THE INVENTION

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are the components to be used to prepare disclosed compositions of the invention as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

A weight percent of a component, unless specifically stated to the contrary, is based on the total weight of the formulation or composition in which the component is included. For example if a particular element or component in a composition or article is said to have 8% weight, it is understood that this percentage is in relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA1, where A and A1 can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

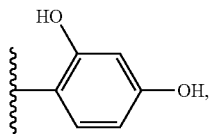

regardless of whether 2,4-dihydroxyphenyl is used to prepare the compound. In some aspects the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some aspects, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkyl-carboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$" can be used interchangeably, and refer to the statistical average molecular weight of all the polymer chains in the sample and is defined by the formula:

$$M_n = \frac{\Sigma N_i M_i}{\Sigma N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\Sigma N_i M_i^2}{\Sigma N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA," "BPA," or "bisphenol A," which can be used interchangeably, as used herein refers to a compound having a structure represented by the formula:

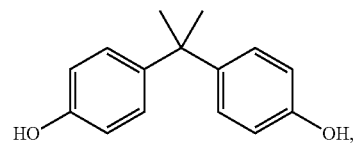

BisA can also be referred to by the name 4,4'-(propane-2, 2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g., dihydroxy aromatic compounds, joined by carbonate linkages; it also encompasses homopolycarbonates, copolycarbonates, and (co)polyester carbonates.

The terms "residues" and "structural units", used in reference to the constituents of the polymers, are synonymous throughout the specification.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Composition

As described above, the present disclosure describes polycarbonate blend compositions generally comprising a polycarbonate polymer, a first polysiloxane-polycarbonate copolymer, a second polysiloxane-polycarbonate copolymer, and a colorant composition. The polycarbonate-siloxane blends achieve improved impact properties, as well as the ability to achieve deep black and bright white colors.

The present disclosure utilizes a first and a second polycarbonate-polysiloxane copolymer which offers good impact properties compared to standard polycarbonates, wherein the first polysiloxane-polycarbonate copolymer comprises a diorganosiloxane content of from 4 to 8 wt % diorganosiloxane based on the total weight of the first polysiloxane-polycarbonate copolymer; and wherein the second polysiloxane-polycarbonate copolymer comprises a diorganosiloxane content of from 15 to 30 wt % diorganosiloxane based on the total weight of the second polysiloxane-polycarbonate copolymer. The second polysiloxane-polycarbonate copolymer is an opaque polycarbonate-polysiloxane copolymer which offers improved impact properties, but is unable to achieve the deep black colors due to the opacity of this copolymer. A blend of both polycarbonate-polysiloxane copolymers, along with a polycarbonate and a colorant composition, allows for improved impact properties while maintaining a constant formulation percentage of siloxane. Plus, the blend of both polycarbonate-polysiloxane copolymers, along with a polycarbonate and a colorant composition, allows for the ability to achieve deep black and bright white colors. Specifically, the relative low color (YI<10 at 3.2 mm thickness) and high transparency (percent haze <3.0 at 3.2 mm thickness) give the blend the ability to achieve deep black and bright white colors.

The present disclosure describes a polycarbonate blend composition comprising: (a) a polycarbonate homopolymer; (b) a first polysiloxane-polycarbonate copolymer comprising: (i) polydiorganosiloxane blocks comprising repeating structural units of formula:

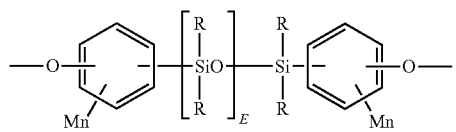

wherein the polydiorganosiloxane block length (E) is from 30 to 60; and (ii) polycarbonate blocks comprising polycarbonate units of formula:

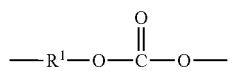

wherein at least 60 percent of the total number of $R^1$ groups comprise aromatic moieties and the balance thereof comprise aliphatic, alicyclic, or aromatic moieties; wherein the first polysiloxane-polycarbonate copolymer comprises a diorganosiloxane content of from 4 to 8 wt % diorganosiloxane based on the total weight of the first polysiloxane-polycarbonate copolymer; (c) a second polysiloxane-polycarbonate copolymer comprising: (i) polydiorganosiloxane blocks comprising repeating structural units of formula:

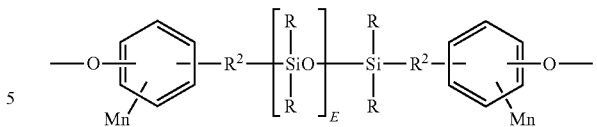

wherein the polydiorganosiloxane block length (E) is from 30 to 100; and (ii) polycarbonate blocks comprising polycarbonate units of formula:

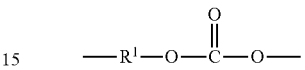

wherein at least 60 percent of the total number of $R^1$ groups comprise aromatic moieties and the balance thereof comprise aliphatic, alicyclic, or aromatic moieties; wherein the second polysiloxane-polycarbonate copolymer comprises a diorganosiloxane content of from 15 to 30 wt % diorganosiloxane based on the total weight of the second polysiloxane-polycarbonate copolymer; and (d) a colorant composition; wherein the blend composition has an average melt flow rate (MFR) of 7 or greater measured at 300° C./1.2 kg; and wherein a molded part having a thickness of 3.2 mm formed from the blend composition has a black color characterized by an average L* value of 27 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 650 J/m or greater and a % ductility of 100% according to ASTM D256-2010.

In one aspect, the invention relates to polycarbonate blend compositions comprising: (a) a first polysiloxane-polycarbonate copolymer comprising: i) polydiorganosiloxane blocks comprising repeating structural units of formula:

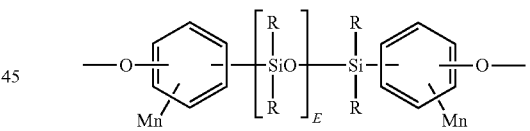

wherein the polydiorganosiloxane block length (E) is from 30 to 60; and ii) polycarbonate blocks comprising polycarbonate units of formula:

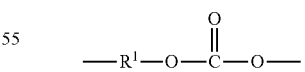

wherein at least 60 percent of the total number of $R^1$ groups comprise aromatic moieties and the balance thereof comprise aliphatic, alicyclic, or aromatic moieties; wherein the first polysiloxane-polycarbonate copolymer comprises a diorganosiloxane content of from 4 to 8 wt % diorganosiloxane based on the total weight of the first polysiloxane-polycarbonate copolymer; (b) a second polysiloxane-polycarbonate copolymer comprising: i) polydiorganosiloxane blocks comprising repeating structural units of formula:

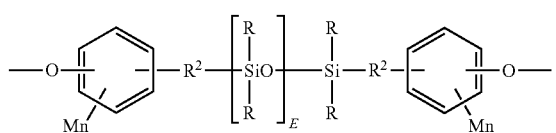

wherein the polydiorganosiloxane block length (E) is from 30 to 100; and ii) polycarbonate blocks comprising polycarbonate units of formula:

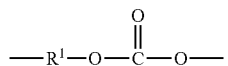

wherein at least 60 percent of the total number of $R^1$ groups comprise aromatic moieties and the balance thereof comprise aliphatic, alicyclic, or aromatic moieties; wherein the second polysiloxane-polycarbonate copolymer comprises a diorganosiloxane content of from 15 to 30 wt % diorganosiloxane based on the total weight of the second polysiloxane-polycarbonate copolymer; and (c) a colorant composition; wherein the blend composition has an average melt flow rate (MFR) of 7 or greater measured at 300° C./1.2 kg; and wherein a molded part having a thickness of 3.2 mm formed from the blend composition has a black color characterized by an average L* value of 28 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 600 J/m or greater and a % ductility of 80% according to ASTM D256-2010; and wherein R is the same or different, and is a $C_{1-13}$ monovalent organic group; $R^2$ is independently a divalent $C_1$-$C_{30}$ organic group; $M_n$ is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one aspect, the invention relates to polycarbonate blend compositions comprising: (a) a polycarbonate polymer; (b) a first polysiloxane-polycarbonate copolymer comprising: i) polydiorganosiloxane blocks comprising repeating structural units of formula:

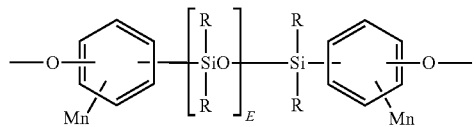

wherein the polydiorganosiloxane block length (E) is from 30 to 60; and ii) polycarbonate blocks comprising polycarbonate units of formula:

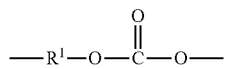

wherein at least 60 percent of the total number of $R^1$ groups comprise aromatic moieties and the balance thereof comprise aliphatic, alicyclic, or aromatic moieties; wherein the first polysiloxane-polycarbonate copolymer comprises a diorganosiloxane content of from 4 to 8 wt % diorganosiloxane based on the total weight of the first polysiloxane-polycarbonate copolymer; (c) a second polysiloxane-polycarbonate copolymer comprising: i) polydiorganosiloxane blocks comprising repeating structural units of formula:

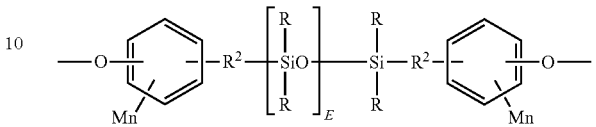

wherein the polydiorganosiloxane block length (E) is from 30 to 100; and ii) polycarbonate blocks comprising polycarbonate units of formula:

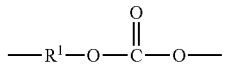

wherein at least 60 percent of the total number of $R^1$ groups comprise aromatic moieties and the balance thereof comprise aliphatic, alicyclic, or aromatic moieties; wherein the second polysiloxane-polycarbonate copolymer comprises a diorganosiloxane content of from 15 to 30 wt % diorganosiloxane based on the total weight of the second polysiloxane-polycarbonate copolymer; and (d) a colorant composition; wherein the blend composition has an average melt flow rate (MFR) of 7 or greater measured at 300° C./1.2 kg; and wherein a molded part having a thickness of 3.2 mm formed from the blend composition has a black color characterized by an average L* value of 28 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 600 J/m or greater and a % ductility of 80% according to ASTM D256-2010; and wherein R is the same or different, and is a $C_{1-13}$ monovalent organic group; $R^2$ is independently a divalent $C_1$-$C_{30}$ organic group; M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one aspect, each $R^2$ is independently a divalent $C_1$-$C_{30}$ organic group such as a $C_1$-$C_{30}$ alkyl, $C_6$-$C_{30}$ aryl or $C_7$-$C_{30}$ alkylaryl.

Each M in the polydiorganosiloxane can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one aspect, M is bromo or chloro, an alkyl group such as methyl, ethyl, or propyl, an alkoxy group such as methoxy, ethoxy, or propoxy, or an aryl group such as phenyl, chlorophenyl, or tolyl, n=0 to 4; $R^2$ is a dimethylene, trimethylene or tetramethylene group; and R is a C1-8 alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, M is methoxy, n is one, $R^2$ is a divalent C1-C3 aliphatic group, and R is methyl.

Polycarbonate Polymer

The polycarbonate polymer may be derived from one dihydroxy monomer or a combination of two or more dihydroxy aromatic monomers, respectively. To that end, as used herein the term "polycarbonate" and "polycarbonate resin" means compositions having repeating structural carbonate units of the formula (I):

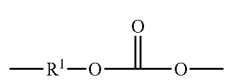

(I)

in which at least about 60% of the total number of $R^1$ groups are aromatic organic groups and the balance thereof are aliphatic, alicyclic, or aromatic groups. In one aspect, each $R^1$ is an aromatic organic group, for example a group of the formula (II):

-$A^1$-$Y^1$-$A^2$-     (II)

wherein each of $A^1$ and $A^2$ is a monocyclic divalent aryl group and $Y^1$ is a bridging group having one or two atoms that separate $A^1$ from $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene.

The polycarbonates may be produced from dihydroxy compounds having the formula HO—$R^1$—OH, wherein $R^1$ is defined as above for formula (I). The formula HO—$R^1$—OH includes bisphenol compounds of formula (III):

HO-$A^1$-$Y^1$-$A^2$-OH     (III)

wherein $Y^1$, $A^1$ and $A^2$ are as described above. Included are bisphenol compounds of general formula (IV):

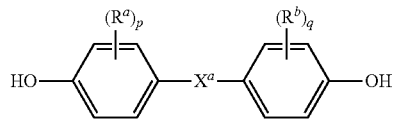

(IV)

wherein $R^a$ and $R^b$ each represent a halogen atom or a monovalent hydrocarbon group and may be the same or different; p and q are each independently integers of 0 to 4; and $X^a$ represents one of the groups of formula (V):

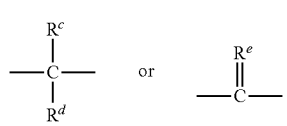

(V)

wherein $R^c$ and $R^d$ each independently represent a hydrogen atom or a monovalent linear alkyl or cyclic alkylene group and $R^e$ is a divalent hydrocarbon group. In one aspect, $R^c$ and $R^d$ represent a cyclic alkylene group; or a heteroatom-containing cyclic alkylene group comprising carbon atoms and heteroatoms with a valency of two or greater. In still a further aspect, a heteroatom-containing cyclic alkylene group comprises at least one heteroatom with a valency of 2 or greater, and at least two carbon atoms. Suitable heteroatoms for use in the heteroatom-containing cyclic alkylene group include —O—, —S—, and —N(Z)—, where Z is a substituent group selected from hydrogen, $C_{1-12}$ alkyl, $C_{1-12}$ alkoxy, or $C_{1-12}$ acyl. Where present, the cyclic alkylene group or heteroatom-containing cyclic alkylene group may have 3 to 20 atoms, and may be a single saturated or unsaturated ring, or fused polycyclic ring system wherein the fused rings are saturated, unsaturated, or aromatic.

Other useful dihydroxy compounds having the formula HO—$R^1$—OH include aromatic dihydroxy compounds of formula (VII):

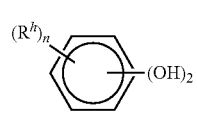

(VII)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine, though it is not limited to only bromine.

Some exemplary dihydroxy compounds include: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, and 1,1-bis(4-hydroxy-3-methylphenyl)cyclohexane (DMBPC). Combinations comprising at least one of the foregoing dihydroxy compounds may also be used.

In yet a further aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4-(4'-(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In still another aspect, mixtures comprising linear polycarbonates and branched polycarbonates can be used.

In at least one aspect, the composition may include, as the polycarbonate polymer, at least one bisphenol-A polycarbonate polymer. Non-limiting examples of the polycarbonate may include high and low flow Lexan™ polycarbonate polymers available in various grades from SABIC Innovative Plastics.

In one aspect, the polycarbonate may be present in the composition as a total amount ranging from 5 wt % to 60 wt %. In another aspect, the polycarbonate may be present in the composition as a total amount ranging from 10 wt % to 55 wt %. In a further aspect, the polycarbonate may be present in the composition as a total amount ranging from 10 wt % to 50 wt %. In an even further aspect, the polycarbonate may be present in the composition as a total amount ranging from 15 wt % to 45 wt %. The polycarbonate may be present as a single bisphenol-A polycarbonate or as a mixture of two or more bisphenol-A polycarbonates.

In another aspect, one polycarbonate may be present in the composition in an amount ranging from 1 wt % to 60 wt %. In a further aspect, one polycarbonate may be present in an amount ranging from 3 wt % to 55 wt %. In another aspect, one polycarbonate may be present in an amount ranging from 3 wt % to 50 wt %. In a still further aspect, one polycarbonate may be present in an amount ranging from 5 wt % to 45 wt %. In a yet further aspect, the polycarbonate polymer is present in an amount in the range of from 15 wt % to 30 wt % relative to the total weight percent of the polycarbonate polymer, first polysiloxane-polycarbonate copolymer, and second polysiloxane-polycarbonate copolymer. In an even further aspect, the polycarbonate polymer is present in an amount in the range of from 22 wt % to 29 wt % relative to the total weight percent of the polycarbonate polymer, first polysiloxane-polycarbonate copolymer, and second polysiloxane-polycarbonate copolymer.

In a further aspect, the polycarbonate polymer is present in an amount in the range of from 15 wt % to 45 wt % relative to the total weight percent of the polycarbonate polymer, first polysiloxane-polycarbonate copolymer, and second polysiloxane-polycarbonate copolymer. In a still further aspect, the polycarbonate polymer is present in an amount in the range of from 24 wt % to 45 wt % relative to the total weight percent of the polycarbonate polymer, first polysiloxane-polycarbonate copolymer, and second polysiloxane-polycarbonate copolymer. In a yet further aspect, the polycarbonate polymer is present in an amount in the range of from 0 wt % to 55 wt % relative to the total weight percent of the polycarbonate polymer, first polysiloxane-polycarbonate copolymer, and second polysiloxane-polycarbonate copolymer. In an even further aspect, the polycarbonate polymer is present in an amount in the range of from 0 wt % to 45 wt % relative to the total weight percent of the polycarbonate polymer, first polysiloxane-polycarbonate copolymer, and second polysiloxane-polycarbonate copolymer.

In at least one aspect, the bisphenol-A polycarbonate has a weight-averaged molecular weight, Mw, between 18,000 and 32,000 g/mol. In a further aspect, the Bisphenol-A polycarbonate has a weight-averaged molecular weight, Mw, between 28,000 and 32,000 g/mol. In at least one aspect, the weight-average molecular weight may be measured using GPC. In at least one aspect, the weight-average molecular weight may be measured using standard procedures, for example, using the method of ASTM D1003.

In various aspects, the polycarbonate polymer comprises a first polycarbonate polymer and a second polycarbonate polymer. In a further aspect, the first polycarbonate polymer is a low flow polycarbonate. In a still further aspect, the second polycarbonate polymer is a high flow polycarbonate.

In a further aspect, the first polycarbonate polymer is present in an amount in the range of from 11 wt % to 29 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 8 wt % relative to the total weight percent of the polycarbonate polymer, first polysiloxane-polycarbonate copolymer, and second polysiloxane-polycarbonate copolymer. In a still further aspect, the first polycarbonate polymer is present in an amount in the range of from 14 wt % to 29 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 8 wt % relative to the total weight percent of the polycarbonate polymer, first polysiloxane-polycarbonate copolymer, and second polysiloxane-polycarbonate copolymer.

In a further aspect, the first polycarbonate polymer is present in an amount in the range of from 10 wt % to 30 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 15 wt % relative to the total weight percent of the polycarbonate polymer, first polysiloxane-polycarbonate copolymer, and second polysiloxane-polycarbonate copolymer.

Polysiloxane-Polycarbonate Copolymer

The polysiloxane-polycarbonate copolymer has a polysiloxane structural unit and a polycarbonate structural unit. The polycarbonate structural unit of the polysiloxane-polycarbonate copolymer may be derived from carbonate units of formula (I) as described above. The carbonate units may be derived from one or more dihydroxy monomers of formula (III) including bisphenol compound of formula (IV), both as described and incorporated herein from above. The dihydroxy compound may be bisphenol-A.

In one aspect, R is the same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an aspect, where a transparent polymer is desired, R does not contain any halogen. Combinations of the foregoing R groups can be used in the same polymer.

The polysiloxane structural unit may be derived from a siloxane-containing dihydroxy compounds (also referred to herein as "hydroxyaryl end-capped polysiloxanes") that contain diorganosiloxane unit blocks of formula (IX):

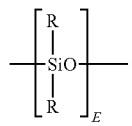

(IX)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an aspect, where a transparent polycarbonate is desired, R does not contain any halogen. Combinations of the foregoing R groups can be used in the same polycarbonate.

The value of E in formula (IX) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an aspect, E has an average value of about 4 to about 90, specifically about 5 to about 80, and more specifically about 40 to about 60.

In one aspect, the polysiloxane blocks are provided by repeating structural units of formula (X):

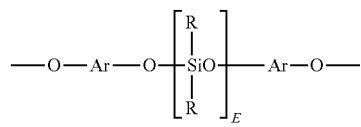

(X)

wherein E is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. The —O—Ar—O— groups in formula (X) can be, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl) cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (XI):

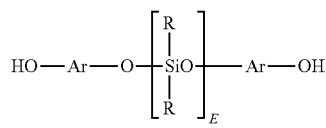

(XI)

wherein Ar and E are as described above. Compounds of formula (XI) can be obtained by the reaction of a dihydroxyaromatic compound with, for example, an alpha, omega-bis-acetoxy-polydiorganosiloxane oligomer under phase transfer conditions. Compounds of formula (XI) can also be obtained from the condensation product of a dihydroxyaromatic compound, with, for example, an alpha, omega bis-chloro-polydimethylsiloxane oligomer in the presence of an acid scavenger.

In another aspect, polydiorganosiloxane blocks can comprise units of formula (XII):

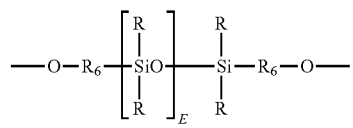

(XII)

wherein R and E are as described above, and each $R_6$ is independently a divalent $C_1$-$C_{30}$ organic group such as a $C_1$-$C_{30}$ alkyl, $C_6$-$C_{30}$ aryl or $C_7$-$C_{30}$ alkylaryl. The polysiloxane blocks corresponding to formula (XII) are derived from the corresponding dihydroxy compound of formula (XIII):

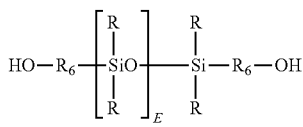
(XIII)

wherein R and E and $R_6$ are as described for formula (XII) above.

In another aspect, the polydiorganosiloxane blocks are provided by repeating structural units of formula (XIV):

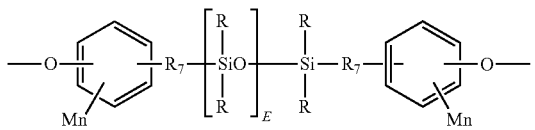
(XIV)

wherein R and E are as defined above. $R_7$ in formula (XIV) is a divalent $C_2$-$C_8$ aliphatic group. Each M in formula (XIV) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_5$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one aspect, M of formula (XIV) is bromo or chloro, an alkyl group such as methyl, ethyl, or propyl, an alkoxy group such as methoxy, ethoxy, or propoxy, or an aryl group such as phenyl, chlorophenyl, or tolyl, n=0 to 4; $R_7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, M is methoxy, n is one, $R_7$ is a divalent $C_1$-$C_3$ aliphatic group, and R is methyl.

Polysiloxane-polycarbonates comprising units of formula (XIV) can be derived from the corresponding dihydroxy polydiorganosiloxane of formula (XV):

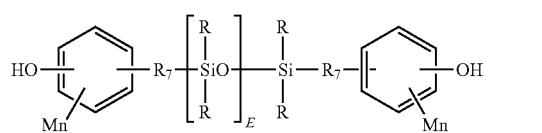
(XV)

wherein each of R, E, M, $R_7$, and n are as described above. Such dihydroxy polysiloxanes can be made by effecting a platinum-catalyzed addition between a siloxane hydride of formula (XVI):

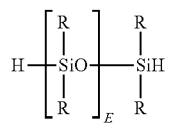
(XVI)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In still a further aspect, the polysiloxane polycarbonate copolymer can be a block copolymer of polycarbonate and eugenol capped polydimethylsilioxane (PDMS) having the general structure (XVII) as shown below:

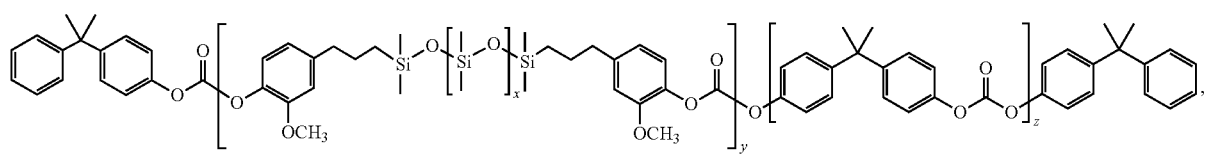
(XVII)

wherein the polysiloxane-polycarbonate block copolymer comprises polycarbonate blocks derived from Bisphenol-A and diorganopolysiloxane blocks of the general formula (XVIII):

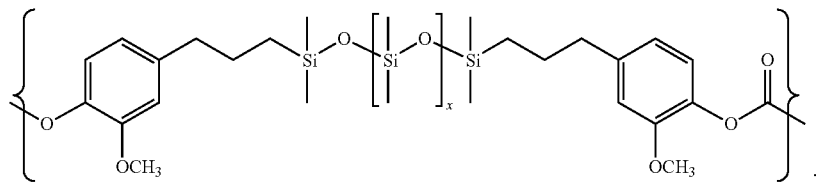
(XVIII)

According to exemplary aspects, the polysiloxane block length "X" of formula (XVIII) is from about 40 to about 60. As describe above, the polysiloxane-polycarbonate block copolymer can optionally be end-capped with p-cumylphenol.

Diorganopolysiloxane blocks of formula (XVIII) can be derived from the corresponding dihydroxy compound of formula (XIX):

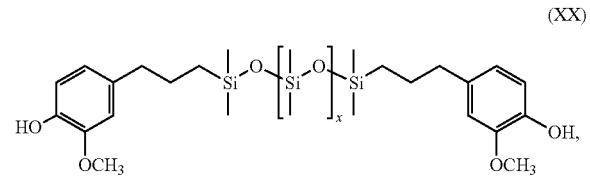

(XX)

wherein x is as described above. Compounds of this type and others are further described in U.S. Pat. No. 4,746,701 to Kress, et al and U.S. Pat. No. 8,017,697 to Carrillo. Compounds of this formula can, for example, be obtained by the reaction of the appropriate dihydroxyarylene compound with, for example, an alpha, omega-bisacetoxypolydiorangonosiloxane under phase transfer conditions.

The polycarbonate-polysiloxane copolymer may be manufactured by reaction of a dihydroxy polysiloxane with a carbonate source and a dihydroxy aromatic compound such as bisphenol-A, optionally in the presence of a phase transfer catalyst as described above. Suitable conditions are similar to those useful in forming polycarbonates as described above. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane is selected so as to provide the desired amount of diorganopolysiloxane units in the copolymer. The particular amounts used will therefore be determined depending on desired physical properties of the composition, the value of x (within the range of about 40 to about 60), and the type and relative amount of each component in the composition, including the type and amount of polycarbonate, type and amount of impact modifier, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein. For example, the amount of dihydroxy polydiorganosiloxane may be selected so as to produce a copolymer comprising about 20 wt. % polydimethylsiloxane. In one aspect, the copolymer may comprise about 20 wt. % siloxane.

In one aspect, the polysiloxane units are of formula (9)

(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination thereof. In an aspect no halogens are present. Combinations of the foregoing R groups can be used in the same copolymer. In an aspect, the polysiloxane comprises R groups that have minimal hydrocarbon content. In a specific aspect, an R group with a minimal hydrocarbon content is a methyl group.

In one aspect, the average value of E in formula (9) can vary widely depending on the type and relative amount of each component in the thermoplastic composition, whether the polymer is linear, branched or a graft copolymer, the desired properties of the composition, and like considerations. In an aspect, E has an average value of 2 to 500, 2 to 200, or 5 to 100, 10 to 100, or 10 to 80. In an aspect E has an average value of 16 to 50, more specifically 20 to 45, and even more specifically 25 to 45. In another aspect, E has an average value of 4 to 50, 4 to 15, specifically 5 to 15, more specifically 6 to 15, and still more specifically 7 to 10.

In an aspect, the polysiloxane units are structural units of formula (9a)

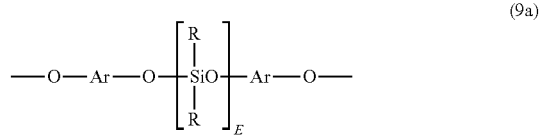

(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an aspect, the dihydroxy aromatic compound is unsubstituted, or is does not contain non-aromatic hydrocarbyl substituents such as alkyl, alkoxy, or alkylene substituents.

In a specific aspect, where Ar is derived from resorcinol, the polysiloxane units are of the formula (9a-1)

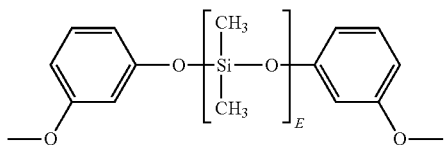

(9a-1)

or, where Ar is derived from bisphenol-A, the polysiloxane has the formula (9a-2)

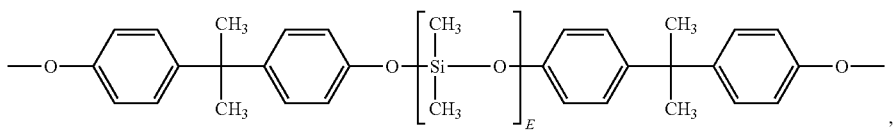

(9a-2)

or a combination comprising at least one of the foregoing can be used, wherein E has an average value as described above, specifically an average value of 2 to 200. In at least one aspect, the first polysiloxance-polycarbonate has an average haze of less than 2.5%.

In one aspect, the first polysiloxane-polycarbonate, the polydiorganosiloxane block length (E) is from 30 to 60. In one aspect, E is from 40 to 60, from 30 to 50, from 50 to 60, from 40 to 50, or from 30 to 40.

In one aspect, each $R^2$ is independently a divalent $C_1$-$C_{30}$ organic group such as a $C_1$-$C_{30}$ alkyl, $C_6$-$C_{30}$ aryl or $C_7$-$C_{30}$ alkylaryl.

The first polysiloxane-polycarbonate copolymer comprises a diorganosiloxane content of from 4 to 8 wt % diorganosiloxane based on the total weight of the first polysiloxane-polycarbonate copolymer. For example, the first polysiloxane-polycarbonate copolymer may comprise a diorganosiloxane content of from 4 to 7 wt %, or from 5 to 7 wt % diorganosiloxane based on the total weight of the first polysiloxane-polycarbonate copolymer. In one aspect, the first polysiloxane-polycarbonate copolymer may comprise a diorganosiloxane content of about 6 wt % diorganosiloxane based on the total weight of the first polysiloxane-polycarbonate copolymer.

In one aspect, the second polysiloxane-polycarbonate the polydiorganosiloxane block length (E) is from 30 to 100. In one aspect, E is from 40 to 90, from 50 to 80, from 60 to 70, from 30 to 50, from 50 to 100, or from 50 to 70.

The second polysiloxane-polycarbonate copolymer comprises a diorganosiloxane content of from 15 to 30 wt % diorganosiloxane based on the total weight of the second polysiloxane-polycarbonate copolymer. For example, the second polysiloxane-polycarbonate copolymer may comprise a diorganosiloxane content of from 15 to 25 wt %, from 17 to 23 wt %, or from 19 to 21 wt % diorganosiloxane based on the total weight of the second polysiloxane-polycarbonate copolymer. In one aspect, the second polysiloxane-polycarbonate copolymer may comprise a diorganosiloxane content of about 20 wt % diorganosiloxane based on the total weight of the second polysiloxane-polycarbonate copolymer In at least one aspect, the first polysiloxane-polycarbonate copolymer has an weight-averaged molecular weight, Mw, between 20,000 and 25,000 g/mol and injection molded parts from the blend composition have an average haze of less than 2.5% at a thickness of 3.2 mm, using the method of ASTM D1003. In a further aspect, the weight-averaged molecular weight, Mw, ranges from 21,000 to 24,000 g/mol, for example ranging from 22,000 to 24,000 g/mol. In at least one aspect, the weight-average molecular weight may be measured using Gel Permeation Chromatography (GPC) using polycarbonate standards. Alternatively, molecular weight determinations can be performed using gel permeation chromatography (GPC), using a crosslinked styrene-divinylbenzene column and calibrated to polycarbonate references. In various aspects, samples are prepared at a concentration of about 1 mg/ml, and are eluted at a flow rate of about 1.0 ml/min.

In a further aspect, the first polysiloxane-polycarbonate copolymer has an weight-averaged molecular weight, Mw, in the range of from 20,000 to 25,000 and wherein an injection molded part having a thickness of 3.2 mm formed from the blend composition has an average haze of less than 2.5% measured according to ASTM D1003.

In at least one aspect, the first polysiloxane-polycarbonate copolymer has a PolyDispersityIndex (PDI) ranging from 2 to 5, for example ranging from 2 to 4, or from 2 to 3. In another aspect, the second polysiloxane-polycarbonate copolymer has a PolyDispersityIndex (PDI) ranging from 2 to 5, for example ranging from 2 to 4, or from 2 to 3.

In a further aspect, the second polysiloxane-polycarbonate copolymer has a weight-averaged molecular weight, Mw, between 25,000 and 35,000 g/mol. In another aspect, the weight-averaged molecular weight, Mw, ranges from 27,000 to 33,000 g/mol, for example, ranging from 28,000 to 32,000 g/mol, further for example, 29,000 to 31,000 g/mol. In at least one aspect, the weight-average molecular weight may be measured using Gel Permeation Chromatography (GPC) using polycarbonate standards. In at least one aspect, the weight-average molecular weight may be measured using standard procedures, for example, using the method of ASTM D1003.

In at least one aspect, the composition may comprise at least one polysiloxane-polycarbonate copolymer. Non-limiting examples of polysiloxane-polycarbonate copolymers which may be used include a transparent polysiloxane-polycarbonate copolymer with a Mw of 23,000 g/mol, 6.0% siloxane, percent haze less than 2.5, or an opaque polysiloxane-polycarbonate copolymer with a Mw of 30,000 g/mol, 20.0% siloxane. In a further aspect, the second polysiloxane-polycarbonate copolymer is an opaque resin.

In at least one aspect, the siloxane units of the first and second polysiloxane-polycarbonate copolymer are dimethyl siloxane units.

In a further aspect, the polydiorganosiloxane has moieties derived from eugenol, 4-allylphenol, or 2-allylphenol In one aspect, the composition may comprise a total amount of polycarbonate copolymer ranging from 50 wt % to 95 wt %. In another aspect, the composition may comprise a total amount of polycarbonate copolymer ranging from 60 wt % to 90 wt %. In a further aspect, the composition may comprise a total amount of polysiloxane-polycarbonate copolymer ranging from 65 wt % to 90 wt %. In one aspect, the composition may comprise a total amount of polysiloxane-polycarbonate copolymer ranging from 70 wt % to 85 wt %. The polysiloxane-polycarbonate copolymer may be present as a single polysiloxane-polycarbonate or as a mixture of two or more polysiloxane-polycarbonates.

In one aspect, at least one polysiloxane-polycarbonate copolymer may be present in an amount ranging from 1 wt % to 95 wt %. In a further aspect, at least one polysiloxane-polycarbonate copolymer may be present in an amount ranging from 2 wt % to 90 wt %. In another aspect, at least one polysiloxane-polycarbonate copolymer may be present in an amount ranging from 2 wt % to 85 wt %. In one aspect, the second polysiloxane-polycarbonate copolymer has at least 5 wt %. In another aspect, the second polysiloxane-polycarbonate copolymer ranges from 5 wt % to 95 wt %.

In one aspect, the second polysiloxane-polycarbonate copolymer is present in the blend composition in an amount less than 5 wt % relative to the total weight percent of the polycarbonate polymer, first polysiloxane-polycarbonate copolymer, and second polysiloxane-polycarbonate copolymer.

In one aspect, the second polysiloxane-polycarbonate copolymer is present in the blend composition in an amount of about 2.5 wt % relative to the total weight percent of the polycarbonate polymer, first polysiloxane-polycarbonate copolymer, and second polysiloxane-polycarbonate copolymer. In a further aspect, the second polysiloxane-polycarbonate copolymer is present in the blend composition in an amount of about 4 wt % relative to the total weight percent of the polycarbonate polymer, first polysiloxane-polycarbonate copolymer, and second polysiloxane-polycarbonate copolymer. In a still further aspect, the second polysiloxane-polycarbonate copolymer is present in the blend composition in an amount less than 5 wt % relative to the total weight percent of the polycarbonate polymer, first polysiloxane-polycarbonate copolymer, and second polysiloxane-polycarbonate copolymer.

In one aspect, combining the first polysiloxane-polycarbonate and the second polysiloxane-polycarbonate, the total weight percentage of siloxane ranges from 4.5 wt % to 5.5 wt % based on the total combined weight of the first polysiloxane-polycarbonate, second polysiloxane-polycarbonate, and polycarbonate. For example, the total weight percentage of siloxane ranges from 4.5 wt % to 5.3 wt % based on the total combined weight of the first polysiloxane-polycarbonate, second polysiloxane-polycarbonate, and polycarbonate. Further for example, the total weight percentage of siloxane ranges from 4.5 wt % to 5.0 wt % based on the total combined weight of the first polysiloxane-polycarbonate, second polysiloxane-polycarbonate, and polycarbonate. Yet further for example, the total weight percentage of siloxane ranges from 4.6 wt % to 4.9 wt % based on the total combined weight of the first polysiloxane-polycarbonate, second polysiloxane-polycarbonate, and polycarbonate. In one aspect, the total weight percentage of siloxane is 4.98 wt % based on the total combined weight of the first polysiloxane-polycarbonate, second polysiloxane-polycarbonate, and polycarbonate.

In a further aspect, the total weight percentage of siloxane ranges from 4.0 wt % to 6.6 wt % based on the total combined weight of the first polysiloxane-polycarbonate, second polysiloxane-polycarbonate, and the polycarbonate. In a still further aspect, the total weight percentage of siloxane ranges from 4.0 wt % to 7 wt % based on the total combined weight of the first polysiloxane-polycarbonate, second polysiloxane-polycarbonate, and the polycarbonate.

In various further aspects, the total combined weight percent of the first and second polysiloxane-polycarbonate copolymers present in the blend composition is in the range of from 70 wt % to 80 wt % relative to the total combined weight percent of the polycarbonate polymer, first polysiloxane-polycarbonate copolymer, and second polysiloxane-polycarbonate copolymer. In a further aspect, the total combined weight percent of the first and second polysiloxane-polycarbonate copolymers present in the blend composition is in the range of from 54 wt % to 100 wt % relative to the total combined weight percent of the polycarbonate polymer, first polysiloxane-polycarbonate copolymer, and second polysiloxane-polycarbonate copolymer. In a still further aspect, the first polysiloxane-polycarbonate copolymer is present in an amount in the range of from 50 wt % to 95 wt % relative to the total combined weight percent of the polycarbonate polymer, first polysiloxane-polycarbonate copolymer, and second polysiloxane-polycarbonate copolymer.

In a further aspect, the first polysiloxane-polycarbonate copolymer is present in an amount in the range of from 65 wt % to 75 wt % relative to the total combined weight percent of the polycarbonate polymer, first polysiloxane-polycarbonate copolymer, and second polysiloxane-polycarbonate copolymer. In a still further aspect, the second polysiloxane-polycarbonate copolymer is present in an amount in the range of from greater than 0 wt % to 5 wt % relative to the total combined weight percent of the polycarbonate polymer, first polysiloxane-polycarbonate copolymer, and second polysiloxane-polycarbonate copolymer.

In various aspects, the total combined weight percent of the first and second polysiloxane-polycarbonate copolymers present in the blend composition is in the range of from 50 wt % to 90 wt % relative to the total combined weight percent of the polycarbonate polymer, first polysiloxane-polycarbonate copolymer, and second polysiloxane-polycarbonate copolymer.

In a further aspect, the first polysiloxane-polycarbonate copolymer is present in an amount in the range of from 50 wt % to 85 wt % relative to the total combined weight percent of the polycarbonate polymer, first polysiloxane-polycarbonate copolymer, and second polysiloxane-polycarbonate copolymer. In a still further aspect, the second polysiloxane-polycarbonate copolymer is present in an amount in the range of from greater than 0 wt % to 5 wt % relative to the total combined weight percent of the polycarbonate polymer, first polysiloxane-polycarbonate copolymer, and second polysiloxane-polycarbonate copolymer.

Colorant Composition

The disclosed composition comprises a colorant composition. The colorant composition comprises primarily organic colorants. As such, the composition comprises less than 1.5 wt % of an inorganic colorant based on the total colorant composition. In another aspect, the composition comprises an inorganic colorant based on the total weight of the composition ranging from 0.25 wt % to 1.5 wt %. In one aspect, the inorganic colorant is carbon black. As such, the composition comprises carbon black in an amount less than 1.5 wt % of the total colorant composition.

In a further aspect, the colorant composition comprises less than 12 wt % of an inorganic colorant based on the total weight of the colorant composition. In a still further aspect, the colorant composition comprises less than 10 wt % of an inorganic colorant based on the total weight of the colorant composition. In a yet further aspect, the colorant composition comprises less than 8 wt % of an inorganic colorant based on the total weight of the colorant composition. In an even further aspect, the colorant composition comprises less than 6 wt % of an inorganic colorant based on the total weight of the colorant composition. In a still further aspect, the colorant composition comprises less than 5 wt % of an inorganic colorant based on the total weight of the colorant composition.

Optional Polymer Additives

In addition to the foregoing components, the disclosed polycarbonate blend compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include an acid scavenger, anti-drip agent, antioxidant, antistatic agent, chain extender, colorant (e.g., pigment and/or dye), de-molding agent, flow promoter, lubricant, mold release agent, plasticizer, quenching agent, stabilizer (including for example a thermal stabilizer, a hydrolytic stabilizer, or a light stabilizer), UV absorbing additive, and UV reflecting additive, or any combination thereof.

For example, the disclosed composition can comprise one or more fillers, acids, specialty chemicals stabilizers, flame-retardants, impact modifiers, colorant, and/or mold release agents. Further for example, the disclosed composition can comprise Irgaphos 168 Ciba Specialty Chemicals and pigments. The disclosed composition may also comprise dilute phosphorous acid, for example 100 times dilution.

In a further aspect, the disclosed polycarbonate blend compositions can further comprise a primary antioxidant or "stabilizer" (e.g., a hindered phenol) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like; or combinations comprising at least one of the foregoing antioxidants.

In a further aspect, the antioxidant is a primary antioxidant, a secondary antioxidant, or combinations thereof. In a still further aspect, the primary antioxidant is selected from a hindered phenol and secondary aryl amine, or a combination thereof. In yet a further aspect, the hindered phenol comprises one or more compounds selected from triethylene glycol bis[3-(3-t-butyl-5-methyl-4-hydroxyphenyl)propionate], 1,6-hexanediol bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl)propionate], 2,2-thiodiethylene bis[3-(3,5-di-t-butyl-4-hydroxyphenyl)propionate], octadecyl 3-(3,5-di-t-butyl-4-hydroxyphenyl)propionate, N,N'-hexamethylene bis(3,5-di-t-butyl-4-hydroxy-hydrocinnamamide), tetrakis(methylene 3,5-di-tert-butyl-hydroxycinnamate)methane, and octadecyl 3,5-di-tert-butylhydroxyhydrocinnamate. In an even further aspect, the hindered phenol comprises octadecyl-3-(3,5-di-t-butyl-4-hydroxyphenyl)-propionate.

In a further aspect, the secondary anti-oxidant is selected from an organophosphate and thioester, or a combination thereof. In a still further aspect, the secondary anti-oxidant comprises one or more compounds selected from tetrakis(2,4-di-tert-butylphenyl) [1,1-biphenyl]-4,4'-diylbisphosphonite, tris(2,4-di-tert-butylphenyl) phosphite, bis(2,4-di-tert-butylphenyl) pentaerythritol diphosphite, bis(2,4-dicumylphenyl)pentaerytritoldiphosphite, tris(nonyl phenyl) phosphite, and distearyl pentaerythritol diphosphite. In yet a further aspect, the secondary anti-oxidant comprises tris(2,4-di-tert-butylphenyl) phosphite.

Antioxidants are generally used in amounts of about 0.01 wt % to about 3 wt %, optionally about 0.05 wt % to about 2.0 wt % of the blended thermoplastic composition.

In a further aspect, the primary antioxidant is present in an amount from about 0.01 wt % to about 3 wt %. In another aspect, the primary antioxidant is present in an amount from about 0.01 wt % to about 2.5 wt %. In still another aspect, the primary antioxidant is present in an amount from about 0.5 wt % to about 2.5 wt %. In yet a further aspect, the primary antioxidant is present in an amount from about 0.5 wt % to about 2.0 wt %. In still another aspect, the primary antioxidant is present in an amount from about 0.1 wt % to about 0.5 wt %. In still another aspect, the primary antioxidant is present in an amount from about 0.2 wt % to about 0.5 wt %. In still another aspect, the primary antioxidant is present in an amount from about 0.2 wt % to about 0.4 wt %.

In a further aspect, the secondary antioxidant is present in an amount from about 0.01 wt % to about 3.0 wt %. In another aspect, the secondary antioxidant is present in an amount from about 0.01 wt % to about 2.5 wt %. In still another aspect, the secondary antioxidant is present in an amount from about 0.5 wt % to about 2.5 wt %. In yet another aspect, the secondary antioxidant is present in an amount from about 0.5 wt % to about 2.0 wt %. In still another aspect, the secondary antioxidant is present in an amount from about 0.05 wt % to about 0.4 wt %. In still another aspect, the secondary antioxidant is present in an amount from about 0.05 wt % to about 0.2 wt %.

In various aspects, the disclosed polycarbonate blend compositions further comprise a hydrolytic stabilizer, wherein the hydrolytic stabilizer comprises a hydrotalcite and an inorganic buffer salt. In a further aspect, the disclosed polycarbonate blend composition comprises a hydrolytic stabilizer, wherein the hydrolytic stabilizer comprises one or more hydrotalcites and an inorganic buffer salt comprising one or more inorganic salts capable of pH buffering. Either synthetic hydrotalcites or natural hydrotalcites can be used as the hydrotalcite compound in the present invention.

Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation).

In a further aspect, suitable thermal stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing thermal stabilizers.

Thermal stabilizers are generally used in amounts of about 0.01 wt % to about 5 wt %, optionally about 0.05 wt % to about 2.0 wt % of the polycarbonate blend composition. In one aspect, the thermal stabilizer is present in an amount from about 0.01 wt % to about 3.0 wt %. In another aspect, the thermal stabilizer is present in an amount from about 0.01 wt % to about 2.5 wt %. In still another aspect, the thermal stabilizer is present in an amount from about 0.5 wt % to about 2.5 wt %. In still another aspect, the thermal stabilizer is present in an amount from about 0.5 wt % to about 2.0 wt %. In still another aspect, the thermal stabilizer is present in an amount from about 0.1 wt % to about 0.8 wt %. In still another aspect, the thermal stabilizer is present in an amount from about 0.1 wt % to about 0.7 wt %. In still another aspect, the thermal stabilizer is present in an amount from about 0.1 wt % to about 0.6 wt %. In still another aspect, the thermal stabilizer is present in an amount from about 0.1 wt % to about 0.5 wt %. In still another aspect, the thermal stabilizer is present in an amount from about 0.1 wt % to about 0.4 wt %. In still another aspect, the thermal stabilizer is present in an amount from about 0.05 wt % to about 1.0 wt %.

In various aspects, plasticizers, lubricants, and/or mold release agents additives can also be used. There is a considerable overlap among these types of materials, which include, for example, phthalic acid esters such as dioctyl-4,5-epoxy-hexahydrophthalate; tris(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis (diphenyl)phosphate of bisphenol-A; poly-alpha-olefins; epoxidized soybean oil; silicones, including silicone oils; esters, for example, fatty acid esters such as alkyl stearyl esters, e.g. methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof; waxes such as beeswax, montan wax, paraffin wax or the like.

Blended thermoplastic composition additives such as plasticizers, lubricants, and/or mold release agents additive are generally used in amounts of about 0.01 wt % to about 20 wt %, optionally about 0.5 wt % to about 10 wt % the polycarbonate blend composition. In one aspect, the mold release agent is methyl stearate; stearyl stearate or pentaerythritol tetrastearate. In another aspect, the mold release agent is pentaerythritol tetrastearate.

In various aspects, the mold release agent is present in an amount from about 0.01 wt % to about 3.0 wt %. In another aspect, the mold release agent is present in an amount from about 0.01 wt % to about 2.5 wt %. In still another aspect, the mold release agent is present in an amount from about 0.5 wt % to about 2.5 wt %. In still another aspect, the mold release agent is present in an amount from about 0.5 wt % to about 2.0 wt %. In still another aspect, the mold release agent is present in an amount from about 0.1 wt % to about 0.6 wt %. In still another aspect, the mold release agent is present in an amount from about 0.1 wt % to about 0.5 wt %.

In a further aspect, the anti-drip agents can also be present. In a further aspect, the anti-drip agent is a styrene-acrylonitrile copolymer encapsulated polytetrafluoroethylene. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers can be made by polymerizing the encapsulating polymer in the presence of the fluoropolymer, for example, in an aqueous dispersion. TSAN can provide significant advantages over PTFE, in that TSAN can be more readily dispersed in the composition. A suitable TSAN can comprise, for example, about 50 wt % PTFE and about 50 wt % SAN, based on the total weight of the encapsulated fluoropolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer.

In a further aspect, the anti-drip agent is present in an amount from about 0.01 wt % to about 3 wt %. In a still further aspect, the anti-drip agent is present in an amount from about 0.01 wt % to about 2.5 wt %. In yet a further aspect, the anti-drip agent is present in an amount from about 0.5 wt % to about 2.0 wt %.

In various aspects, the polycarbonate blend compositions of the present invention can further comprise an acid or an acid salt. In one embodiment, the acid or acid salt is an inorganic acid or inorganic acid salt. In one embodiment, the acid is an acid including a phosphorous containing oxy-acid. In one embodiment, the phosphorous containing oxy-acid is a multi-protic phosphorus containing oxy-acid having the general formula:

$$H_m P_t O_n,$$

where m and n are each 2 or greater and t is 1 or greater. Examples of the acids of the foregoing formula include, but are not limited to, acids represented by the following formulas: $H_3PO_4$, $H_3PO_3$, and $H_3PO_2$. Other exemplary acids include phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. Alternatively, acids and acid salts, such as, for example, sulphuric acid, sulphites, mono zinc phosphate, mono calcium phosphate, sodium acid pyrophosphate, mono natrium phosphate, and the like, can be used. The acid or acid salt is selected so that it can be effectively combined with the mineral filler to produce a synergistic effect and a balance of properties, such as flow and impact, in the polycarbonate or polycarbonate blend. In a further aspect, the weight ratio of acid to mineral filler component, or acid:mineral filler component weight ratio, can be from about 0.001 to about 0.04.

Properties of the Polycarbonate Blend Compositions

In at least one aspect, the composition has improved impact properties. The improved impact properties may be seen at low temperatures. The improved impact properties allow the composition to have reduced cracking upon impact.

In a further aspect, the molded parts have an average notched Izod energy at 23° C. ranging from 700 to 900 J/m and a % ductility of 100% according to ASTM D256-2010, for the black blends, and ranging from 600 to 800 J/m and a % ductility of 100% according to ASTM D256-2010, for the white blends. In an even further aspect, the molded parts have an average notched Izod energy at −30° C. ranging from 600 to 800 J/m and a % ductility of 100% according to ASTM D256-2010, for the black blends, and ranging from 450 to 650 J/m ° C. and a % ductility of 100% according to ASTM D256-2010, for the white blends. In at least one aspect, the molded parts have an average notched Izod energy at −40° C. of 550 to 750 J/m and a % ductility of 100% according to ASTM D256-2010, for black blends. In at least one aspect, the molded parts have an average notched Izod energy at −40° C. of 450 to 650 J/m and a % ductility of 100% according to ASTM D256-2010, for white blends. In another aspect, the molded parts have an average notched Izod energy at −50° C. of 500 to 700 J/m and a % ductility of 100% according to ASTM D256-2010, for black blends. In at least one aspect, the molded parts have an average notched Izod energy at −50° C. of 150 to 600 J/m and a % ductility of 100% according to ASTM D256-2010, for white blends.

In one aspect, the molded part having a thickness of 3.2 mm formed from the blend composition has an average notched Izod energy at −40° C. of 700 J/m or greater and a ductility of 100% according to ASTM D256-2010. In another aspect, the a molded part having a thickness of 3.2 mm formed from the blend composition has an average notched Izod impact energy at −30° C. of 650 J/m or greater and a % ductility of 100% according to ASTM D256-2010.

In a further aspect, the molded part having a thickness of 3.2 mm formed from the blend composition has an average notched Izod impact energy at −40° C. of 500 J/m or greater and a % ductility of 100% according to ASTM D256-2010.

In a further aspect, the molded part having a thickness of 3.2 mm formed from the blend composition has an average notched Izod impact energy at −50° C. of 500 J/m or greater and a % ductility of 80% according to ASTM D256-2010.

In at least one aspect, the composition has an average melt flow rate (MFR) of 7 or greater at 300° C./1.2 kg. In at least one aspect, the composition has an average MFR ranging from 7 to 20 at 300° C./1.2 kg. In a further aspect, the composition has an average MFR ranging from 7 to 15 at 300° C./1.2 kg, for example ranging from 7 to 11 at 300° C./1.2 kg.

In at least one aspect, when there is an absence of colorants in the composition, the percent light transmission ranges from 73 to 85% and the percent haze ranges from 2 to 12%, when the thickness is 3.2 mm In at least one aspect, the composition has a deep black color capability. The deep black color capability is shown by L* (D65 illum, 10 deg, specular component included). The L* is measured using CIE Lab method, 10 degree observer, D65 illuminant, specular component included, measured in reflectance mode. In one aspect, the deep black color capability, L*, is less than 27.0. In at least one aspect, the deep black color capability L* ranges from 1 to 27.0. In another aspect, the deep black color capability L* ranges from 10 to 27.0. In a further aspect, the deep black color capability L* ranges from 20 to 27.0. In a further aspect, the deep black color capability L* ranges from 10 to 20. In a still further aspect, the deep black color capability L* ranges from 25 to 29. In a yet further aspect, the deep black color capability L* ranges from 26 to 28.

In at least one aspect, the composition has a deep black color capability. The deep black color capability is shown by L* (D65 illum, 10 deg, specular component included). The L* is measured using CIE Lab method, 10 degree observer, D65 illuminant, specular component included, measured in reflectance mode. In one aspect, the deep black color capability, L*, is less than 28.0. In at least one aspect, the deep black color capability L* ranges from 1 to 28.0. In another aspect, the deep black color capability L* ranges from 10 to 28.0. In a further aspect, the deep black color capability L* ranges from 20 to 28.0. In one aspect, the deep black color capability L* ranges from 10 to 20. In a still further aspect, the deep black color capability L* ranges from 26 to 30. In a yet further aspect, the deep black color capability L* ranges from 27 to 29.

In at least one aspect, the composition has a bright white color capability. The bright white color capability is shown by L* (D65 illum, 10 deg, specular component included). The L* is measured using CIE Lab method, 10 degree observer, D65 illuminant, specular component included, measured in reflectance mode. In one aspect, the bright white color capability L* is greater than 97.0. In at least one aspect, the bright white color capability L* is greater than 98.0. In a further aspect, the bright white color capability L* ranges from 95 to 99. In an even further aspect, the bright white color capability L* ranges from 97 to 99. In a yet further aspect, the bright white color capability L* ranges from 97.0 to 98.5.

Methods of Manufacture

The polycarbonate blend compositions of the present invention can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods, including batch or continuous techniques that employ kneaders, extruders, mixers, and the like. For example, the composition can be formed as a melt blend employing a twin-screw extruder. In some embodiments at least some of the components are added sequentially. For example, the polycarbonate polymer, the first polysiloxane-polycarbonate component, the second polysiloxane-polycarbonate component, and the colorant composition can be added to the extruder at the feed throat or in feeding sections adjacent to the feed throat, or in feeding sections adjacent to the feed throat, while the various composition additives, e.g. antioxidants and/or a mold release agent, can be added to the extruder in a subsequent feeding section downstream. Alternatively, the sequential addition of the components may be accomplished through multiple extrusions. A composition may be made by preextrusion of selected components, such as the polycarbonate polymer, the first polysiloxane-polycarbonate component, the second polysioxane-polycarbonate component, and the colorant composition to produce a pelletized mixture. A second extrusion can then be employed to combine the preextruded components with any remaining components. Additional composition additives, e.g. antioxidants and/or mold release agents, can be added as part of a masterbatch or directly. The composition additives can be added either at the feedthroat or downstream. The extruder can be a two lobe or three lobe twin screw extruder.

In various aspects, the polycarbonate polymer, the first polysiloxane-'polycarbonate component, the second polysiloxane-polycarbonate component, the colorant composition and/or other optional components are first blended in a HENSCHEL-Mixer™ high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, can be one-fourth inch long or less as desired. Such pellets can be used for subsequent molding, shaping, or forming.

In various aspects, the invention relates to methods of preparing a composition, the method comprising the step of mixing a polycarbonate polymer, a first polysiloxane-polycarbonate copolymer, a second polysiloxane-polycarbonate copolymer, and a colorant composition.

In one aspect, the invention relates to methods of a preparing a composition, comprising the step of mixing: (a) a polycarbonate homopolymer; (b) a first polysiloxane-polycarbonate copolymer comprising: (i) polydiorganosiloxane blocks comprising repeating structural units of formula:

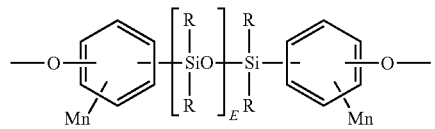

wherein the polydiorganosiloxane block length (E) is from 30 to 60; and (ii) polycarbonate blocks comprising polycarbonate units of formula:

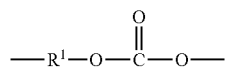

wherein at least 60 percent of the total number of R$^1$ groups comprise aromatic moieties and the balance thereof comprise aliphatic, alicyclic, or aromatic moieties; wherein the first polysiloxane-polycarbonate copolymer comprises a diorganosiloxane content of from 4 to 8 wt % diorganosiloxane based on the total weight of the first polysiloxane-polycarbonate copolymer; (c) a second polysiloxane-polycarbonate copolymer comprising: (i) polydiorganosiloxane blocks comprising repeating structural units of formula:

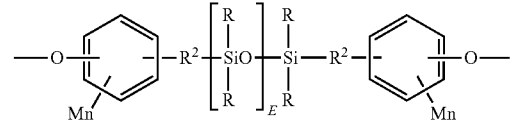

wherein the polydiorganosiloxane block length (E) is from 30 to 100; and (ii) polycarbonate blocks comprising polycarbonate units of formula:

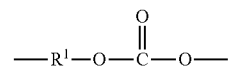

wherein at least 60 percent of the total number of R$^1$ groups comprise aromatic moieties and the balance thereof comprise aliphatic, alicyclic, or aromatic moieties; wherein the second polysiloxane-polycarbonate copolymer comprises a diorganosiloxane content of from 15 to 30 wt % diorganosiloxane based on the total weight of the second polysiloxane-polycarbonate copolymer; and (d) a colorant composition; wherein the blend composition has an average melt flow rate (MFR) of 7 or greater measured at 300° C./1.2 kg; and wherein a molded part having a thickness of 3.2 mm formed from the blend composition has a black color characterized by an average L* value of 27 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 650 J/m or greater and a % ductility of 100% according to ASTM D256-2010.

In one aspect, the invention relates to methods of a preparing a composition, comprising the step of mixing: (a) from 15 wt % to 30 wt % of a polycarbonate homopolymer; (b) from 11 wt % to 29 wt % of a first polysiloxane-polycarbonate copolymer comprising: (i) polydiorganosiloxane blocks comprising repeating structural units of formula:

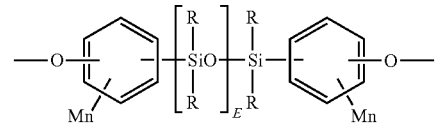

wherein the polydiorganosiloxane block length (E) is from 30 to 60; and (ii) polycarbonate blocks comprising polycarbonate units of formula:

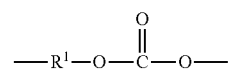

wherein at least 60 percent of the total number of R$^1$ groups comprise aromatic moieties and the balance thereof comprise aliphatic, alicyclic, or aromatic moieties; wherein the first polysiloxane-polycarbonate copolymer comprises a diorganosiloxane content of from 4 to 8 wt % diorganosiloxane based on the total weight of the first polysiloxane-polycarbonate copolymer; (c) from greater than 0 wt % to 8 wt % of a second polysiloxane-polycarbonate copolymer comprising: (i) polydiorganosiloxane blocks comprising repeating structural units of formula:

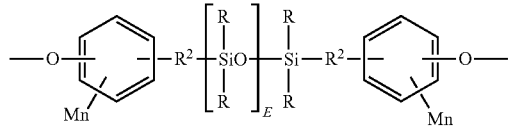

wherein the polydiorganosiloxane block length (E) is from 30 to 100; and (ii) polycarbonate blocks comprising polycarbonate units of formula:

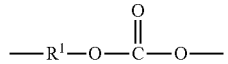

wherein at least 60 percent of the total number of $R^1$ groups comprise aromatic moieties and the balance thereof comprise aliphatic, alicyclic, or aromatic moieties; wherein the second polysiloxane-polycarbonate copolymer comprises a diorganosiloxane content of from 15 to 30 wt % diorganosiloxane based on the total weight of the second polysiloxane-polycarbonate copolymer; and (d) a colorant composition; wherein the total weight percent wherein the total weight percent is relative to the polycarbonate polymer, first polysiloxane-polycarbonate copolymer, and second polysiloxane-polycarbonate copolymer blend composition has an average melt flow rate (MFR) of 7 or greater measured at 300° C./1.2 kg; and wherein a molded part having a thickness of 3.2 mm formed from the blend composition has a black color characterized by an average L* value of 27 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 650 J/m or greater and a % ductility of 100% according to ASTM D256-2010.

In one aspect, the invention relates to methods of a preparing a composition, comprising the step of mixing: (a) from 15 wt % to 45 wt % of a polycarbonate homopolymer; (b) from 50 wt % to 96 wt % of a first polysiloxane-polycarbonate copolymer comprising: (i) polydiorganosiloxane blocks comprising repeating structural units of formula:

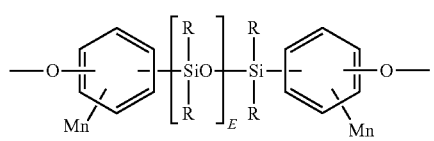

wherein the polydiorganosiloxane block length (E) is from 30 to 60; and (ii) polycarbonate blocks comprising polycarbonate units of formula:

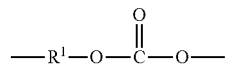

wherein at least 60 percent of the total number of $R^1$ groups comprise aromatic moieties and the balance thereof comprise aliphatic, alicyclic, or aromatic moieties; wherein the first polysiloxane-polycarbonate copolymer comprises a diorganosiloxane content of from 4 to 8 wt % diorganosiloxane based on the total weight of the first polysiloxane-polycarbonate copolymer; (c) from greater than 0 wt % to 8 wt % of a second polysiloxane-polycarbonate copolymer comprising: (i) polydiorganosiloxane blocks comprising repeating structural units of formula:

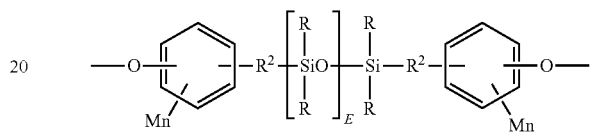

wherein the polydiorganosiloxane block length (E) is from 30 to 100; and (ii) polycarbonate blocks comprising polycarbonate units of formula:

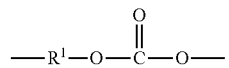

wherein at least 60 percent of the total number of $R^1$ groups comprise aromatic moieties and the balance thereof comprise aliphatic, alicyclic, or aromatic moieties; wherein the second polysiloxane-polycarbonate copolymer comprises a diorganosiloxane content of from 15 to 30 wt % diorganosiloxane based on the total weight of the second polysiloxane-polycarbonate copolymer; and (d) a colorant composition; wherein the total weight percent wherein the total weight percent is relative to the polycarbonate polymer, first polysiloxane-polycarbonate copolymer, and second polysiloxane-polycarbonate copolymer blend composition has an average melt flow rate (MFR) of 7 or greater measured at 300° C./1.2 kg; and wherein a molded part having a thickness of 3.2 mm formed from the blend composition has a black color characterized by an average L* value of 27 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 650 J/m or greater and a % ductility of 100% according to ASTM D256-2010.

Methods to Reduce Cracking

The composition may be used as part of a method for reducing cracking because of its impact properties.

In at least one aspect, a method for reducing the rate of cracking of an electronic housing, the method comprising: a) providing the composition, disclosed above; b) molding said electronic housing; and c) applying stress to said housing.

In one aspect, the electronic housing may be housing for a cell phone or smart phone. In another aspect, a method of making a housing to reduce the rate of cracking, the method comprising: a) providing the composition, disclosed above; b) molding the composition, disclosed above; c) hard coating the composition with a hard coat that is less than or equal to 13 microns; and d) drilling one or more apertures in said molded housing.

The method may be used to prepare housing for a gaming system, a cell phone, a smart phone, a GPS device, a laptop computer, a tablet computer, an e-reader, a copier, a sports goggle, or an eyeglass frame.

The molding and the hard coating performed in the method may be done using standard techniques. The aperture drilling may be performed using standard techniques.

The reduced rate of cracking may be seen by the impact properties. For example, the improved impact strength may show a reduced rate of cracking. In other words, this relationship may be illustrated by the greater the impact strength, the smaller the rate of cracking. The impact strength may be shown by the average notched Izod energy, for example according to the ASTM D256-2010. The impact strength or properties may also be shown by other standard tests used to measure impact properties.

The hard coating may have a hard coat that is less than or equal to 13 microns. The hard coating may have a hard coat that is less than or equal to 10 microns. The hard coating may have a hard coat that is less than or equal to 7 microns.

Still further, the resulting composite mixture can be used to provide any desired shaped, formed, or molded articles. For example, the composite mixture may be molded into useful shaped articles by a variety of means such as injection molding, extrusion, rotational molding, blow molding and thermoforming. As noted above, the disclosed composites are particularly well suited for use in the manufacture of electronic components and devices. As such, according to some aspects, the disclosed composites can be used to form articles such as printed circuit board carriers, burn in test sockets, flex brackets for hard disk drives, and the like.

Articles of Manufacture

The improved impact properties make the composition suitable for use in an article. For example, in various aspects, the present invention pertains to shaped, formed, or molded articles comprising the polycarbonate blend compositions. The polycarbonate blend compositions can be molded into useful shaped articles by a variety of means such as injection molding, extrusion, rotational molding, blow molding and thermoforming to form articles. The polycarbonate blend compositions described herein can also be made into film and sheet as well as components of laminate systems. In a further aspect, a method of manufacturing an article comprises melt blending the polycarbonate polymer, the first polysiloxane-polycarbonate component, the second polysiloxane-polycarbonate component, and the colorant composition; and molding the extruded composition into an article. In a still further aspect, the extruding is done with a twin-screw extruder.

In at least one aspect, the article is an injection molded article. In a further aspect, the article is an extruded film or sheet. The composition may be formed into the article, film, or sheet using conventional methods.

In at least one aspect, the article has a thickness less than 1.5 mm.

In an even further aspect, the article, film, or sheet may be used to form an apparatus. In a yet further aspect, the article may have one or more apertures.

In at least one aspect, the article is a component for an electronic device. In a further aspect, the electronic device is selected from a gaming system, a cell phone, a smart phone, a GPS device, a laptop computer, a tablet computer, an e-reader, a copier. In another aspect, the article is a component for a sports goggle or an eyeglass frame. For example, the article may be a component of a smart phone.

In various further aspects, formed articles include, for example, personal computers, notebook and portable computers, cell phone antennas and other such communications equipment, medical applications, RFID applications, automotive applications, and the like. In various further aspects, the article is a computer and business machine housing such as a housing for high end laptop personal computers, monitors, a hand held electronic device housing such as a housing for smart phones, tablets, music devices electrical connectors, and components of lighting fixtures, ornaments, home appliances, and the like.

In a further aspect, the present invention pertains to electrical or electronic devices comprising the disclosed polycarbonate blend compositions. In a further aspect, the electrical or electronic device comprising the disclosed polycarbonate blend compositions is a cellphone, a MP3 player, a computer, a laptop, a camera, a video recorder, an electronic tablet, a pager, a hand receiver, a video game, a calculator, a wireless car entry device, an automotive part, a filter housing, a luggage cart, an office chair, a kitchen appliance, an electrical housing, an electrical connector, a lighting fixture, a light emitting diode, an electrical part, or a telecommunications part.

In various aspects, the polymer composition can be used in the field of electronics. In a further aspect, non-limiting examples of fields which can use the disclosed blended thermoplastic polymer compositions include electrical, electro-mechanical, radio frequency (RF) technology, telecommunication, automotive, aviation, medical, sensor, military, and security. In a still further aspect, the use of the disclosed blended thermoplastic polymer compositions can also be present in overlapping fields, for example in mechatronic systems that integrate mechanical and electrical properties which may, for example, be used in automotive or medical engineering.

EXAMPLES

The following examples are put forth so as to provide those of ordinary skill in the art with a complete disclosure and description of how the electrostatic dissipative composites disclosed and claimed herein can be made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

In the following example, the polycarbonate-siloxane copolymer blend composition was manufactured and tested. The raw materials used in the composition are shown in Table 1.

TABLE 1

Raw Material Description

| Raw Material | Description |
|---|---|
| PCPS1 | PC Siloxane copolymer with a Mw of 23,000 g/mol, 6.0% siloxane, % haze < 2.5, PDI 2.3-2.8, para-cumylphenol endcap. |
| PCPS2 | PC Siloxane copolymer with a Mw of 30,000 g/mol, 20.0% siloxane, opaque, PDI 2.3-2.8, para-cumylphenol endcap. |

TABLE 1-continued

Raw Material Description

| Raw Material | Description |
|---|---|
| PC1 | Bisphenol-A polycarbonate with a Mw of 29,700 g/mol, para-cumylphenol endcap, available from SABIC INNOVATIVE PLASTICS. |
| PC2 | Bisphenol-A polycarbonate with a Mw of 21,800 g/mol, para-cumylphenol endcap, available from SABIC INNOVATIVE PLASTICS. |
| PC3 | Bisphenol A polycarbonate resin made by interfacial polymerization, para-cumylphenol endcap, with a weight average molecular weight ($M_w$) of about 20,000 to 24,000 g/mol relative to polystyrene standards, and MFR at 300° C./1.2 kg, of about 23.5 to about 28.5 g/10 min. |
| PC4 | Bisphenol A polycarbonate resin made by interfacial polymerization, phenol endcap, with a weight average molecular weight ($M_w$) of about 28,000 to 32,000 g/mol relative to polystyrene standards and MFR at 300° C./1.2 kg, of about 23.5 to about 28.5 g/10 min. |
| AO1 | Antioxidant, Tris (2,4-di-tert-butylphenyl)phosphite; available under the trade name Irgafos™ 168 (Ciba Specialty Chemicals). |
| PA1 | Phosphorous acid; used at a 100-fold dilution in water. |
| PA2 | Phosphorous acid; powder mixture of 0.62% of phosphorous acid solution in water (45%) and 99.38% of Bisphenol A polycarbonate. |
| CB | Carbon Black (Pigment Black) |
| TD | Titanium Dioxide, coated (Pigment White 6) |
| UV | UV absorber from the benzotriazole class with the chemical name 2-(2'-Hydroxy-5'-octylphenyl)-benzotriazol; available under the trade name CYASORB™ UV-5411. |
| PETS | Release agent, pentaerythritoltetrastearate; available under the trade name Glycolube P (Lonza). |

The tested polycarbonate-siloxane copolymer blend compositions are listed in Table 2a and Table 2b. Table 2a shows the compositions in solvent black color. Table 2b shows the compositions in bright white color. For every composition the siloxane percentage equals 4.98 w %, meaning that the siloxane percentage is held constant. Additional solvent black compositions are described in Table 6 below.

TABLE 2a

Compositions in solvent black color in weight percentage.

| Code | BK-1 | BK-2 | BK-3 | BK-4 | BK-5 |
|---|---|---|---|---|---|
| PCPS1 | 83.00 | 83.00 | 74.70 | 74.70 | 66.40 |
| PCPS2 | 0.000 | 0.000 | 2.500 | 2.500 | 5.000 |
| PC1 | 11.000 | 17.000 | 14.800 | 22.800 | 28.600 |
| PC2 | 6.000 | 0.000 | 8.000 | 0.000 | 0.000 |
| AO1 | 0.060 | 0.060 | 0.060 | 0.060 | 0.060 |
| PA1 | 0.033 | 0.033 | 0.033 | 0.033 | 0.033 |
| CB | 0.0013 | 0.0013 | 0.0013 | 0.0013 | 0.0013 |
| OC* | 0.1111 | 0.1111 | 0.1111 | 0.1111 | 0.1111 |

*Organic colorant mixture consisting of 0.0309 Solvent Green 3, 0.0291 Solvent Red 52, 0.0001 Solvent Blue 104, and 0.0510 Solvent Yellow 93.

TABLE 2b

Compositions in bright white color in weight percentage.

| Code | WH-1 | WH-2 | WH-3 | WH-4 | WH-5 |
|---|---|---|---|---|---|
| PCPS1 | 83.00 | 83.00 | 74.70 | 74.70 | 49.80 |
| PCPS2 | 0.000 | 0.000 | 2.500 | 2.500 | 10.000 |
| PC1 | 11.000 | 17.000 | 14.800 | 22.800 | 40.200 |
| PC2 | 6.000 | 0.000 | 8.000 | 0.000 | 0.000 |
| AO1 | 0.060 | 0.060 | 0.060 | 0.060 | 0.060 |
| PA1 | 0.033 | 0.033 | 0.033 | 0.033 | 0.033 |
| TD | 5.000 | 5.000 | 5.000 | 5.000 | 5.000 |
| OC* | 0.01625 | 0.01625 | 0.01625 | 0.01625 | 0.01625 |

*Organic colorant mixture consisting of 0.0162 2,2'-(1,2-ethenediyl)bis(4,1-phenylene) bisbenzoxazole, 0.00003 Pigment Blue 29, and 0.00002 Solvent Yellow 93.

TABLE 2c

Compositions in natural color (no pigments)

| Code | NAT-1 | NAT-2 | NAT-3 | NAT-4 |
|---|---|---|---|---|
| PCPS1 | 83.00 | 74.70 | 66.40 | 49.80 |
| PCPS2 | 0.000 | 2.500 | 5.000 | 10.000 |
| PC1 | 11.000 | 22.800 | 28.600 | 40.200 |
| PC2 | 6.000 | 0.000 | 0.000 | 0.000 |
| AO1 | 0.060 | 0.060 | 0.060 | 0.060 |
| PA1 | 0.033 | 0.033 | 0.033 | 49.80 |

The compositions were compounded in a ZSK 30 mm co-rotating twin screw extruder using a melt temperature of 300° C. with a rate of 20 kgs/hr, and 20 inches of mercury vacuum and a screw speed of 400 RPM. The extrudate was cooled under water, pelletized and dried at 120° C. for four hours with a desiccant bed dryer. To make the test specimens, the dried pellets were injection molded using a Van Dorn 80T molding machine at 300° C. melt temperature to form test parts for impact and mechanical testing. Physical and mechanical properties of the test materials were measured using ASTM and ISO test standards.

A comparison of the physical properties between these materials is shown below in Table 3 and Table 4. Table 3 shows the impact data for the compositions in solvent black color. Table 4 shows the impact property data for the compositions in bright white color.

TABLE 3

| Test | BK-1 | BK-2 | BK-3 | BK-4 | BK-5 |
|---|---|---|---|---|---|
| Deep Black Color Capability (L*)[1] | 26.81 | 26.85 | 26.93 | 26.95 | 27.82 |
| Melt flow (MFR)[2] | 10.2 | 9.0 | 10.5 | 8.4 | 8.2 |
| NII[3] (23° C.) | 759 | 762 | 808 | 829 | 866 |
| Ductility[3] (23° C.) | 100 | 100 | 100 | 100 | 100 |
| NII[3] (−30° C.) | 601 | 621 | 684 | 747 | 789 |
| Ductility[3] (−30° C.) | 80 | 100 | 100 | 100 | 100 |
| NII[3] (−40° C.) | 555 | 560 | 628 | 723 | 691 |
| Ductility[3] (−40° C.) | 0 | 0 | 20 | 100 | 100 |
| NII[3] (−50° C.) | 524 | 535 | 578 | 678 | 663 |
| Ductility[3] (−50° C.) | 0 | 0 | 20 | 40 | 100 |

[1]Measured on a molded part having a thickness of 3.2 mm formed from the indicated blend composition has a black color characterized by an average L* value of 27 or less as measured by the CIE Lab method, 10 degree observer, D65 illuminant, specular component included, measured in reflectance mode.
[2]Measured in accordance with ASTM 1238 at a temperature of 300° C. under a 1.2 kg load. MFR values above are provided in gm/10 min.
[3]Measured on a molded part having a thickness of 3.2 mm formed from the indicated blend composition has an average notched Izod impact (NII) strength and ductility at the indicated temperature and determined in accordance with ASTM D256-2010. The NII strength values above are given in J/m and ductility values are given in percent.

TABLE 4

| Test[1] | WH-1 | WH-2 | WH-3 | WH-4 | WH-5 |
|---|---|---|---|---|---|
| Deep Black Color Capability (L*) | 98.39 | 98.31 | 98.27 | 98.15 | 97.94 |
| Melt flow (MFR) | 10.6 | 9.3 | 9.9 | 8.5 | 7.2 |

TABLE 4-continued

| Test[1] | WH-1 | WH-2 | WH-3 | WH-4 | WH-5 |
|---|---|---|---|---|---|
| NII (23° C.) | 666 | 667 | 694 | 740 | 791 |
| Ductility (23° C.) | 100 | 100 | 100 | 100 | 100 |
| NII (−30° C.) | 538 | 474 | 534 | 585 | 641 |
| Ductility (−30° C.) | 40 | 0 | 0 | 100 | 100 |
| NII (−40° C.) | 473 | 477 | 506 | 546 | 609 |
| Ductility (−40° C.) | 0 | 0 | 20 | 50 | 100 |
| NII (−50° C.) | 190 | 223 | 455 | 446 | 570 |
| Ductility (−50° C.) | 0 | 0 | 0 | 0 | 100 |

TABLE 5

| Sample Number | % Transmission (3.2 mm thickness, ASTM D1003) | % Haze (3.2 mm thickness, ASTM D1003) |
|---|---|---|
| NAT-1 | 85.4 | 2.3 |
| NAT-2 | 73.0 | 11.5 |
| NAT-3 | 51.8 | 58.6 |
| NAT-4 | 37.4 | 101.0 |

The results listed in Table 3 show that the addition of PC1 polycarbonate (BK-2) or 2.5 wt % PCPS2 (BK-3) result in modest improvement in low temperature impact energy and percent ductility. The addition of both PC1 polycarbonate and 2.5 wt % PCPS2 (BK-4) shows 100% ductility at −40° C. and deep black color capability (L*<27.0). the addition of 5.0 wt % PCPS2 shows 100% ductility at −50° C. but is not capable of deep black color (L*>27.0).

The results listed in Table 4 also show improvements in low temperature ductility. For example, 10 wt % PCPS2 and PC1 in sample WH-5 shows 100% ductility at −50° C. Further, samples WH-1 through WH-4 are capable of achieving bright white color (L*>98.0).

TABLE 6

Compositions in solvent black color in weight percentage.

| Code | BK-6 | BK-7 | BK-8 | BK-9 | BK-10 | BK-11 | BK-12 | BK-13 | BK-14 |
|---|---|---|---|---|---|---|---|---|---|
| PCPS1 | 96 | 82 | 52 | 40 | 32 | 95 | 80 | 50 | 40 |
| PCPS2 | 4 | 4 | 4 | 4 | 4 | 5 | 5 | 5 | 5 |
| PC3 | — | 8 | 15 | 18 | 21 | — | 5 | 15 | 18 |
| PC4 | — | 16 | 29 | — | — | — | 10 | 30 | 27 |
| PETS | 0.27 | 0.27 | 0.27 | 0.27 | 0.27 | 0.27 | 0.27 | 0.27 | 0.27 |
| AO1 | 0.10 | 0.10 | 0.10 | 0.10 | 0.10 | 0.10 | 0.10 | 0.10 | 0.10 |
| UV | 0.30 | 0.30 | 0.30 | 0.30 | 0.30 | 0.30 | 0.30 | 0.30 | 0.30 |
| PA | 0.024 | 0.024 | 0.024 | 0.024 | 0.024 | 0.024 | 0.024 | 0.024 | 0.024 |
| OC* | 0.1111 | 0.1111 | 0.1111 | 0.1111 | 0.1111 | 0.1111 | 0.1111 | 0.1111 | 0.1111 |
| CB | 0.0013 | 0.0013 | 0.0013 | 0.0013 | 0.0013 | 0.0013 | 0.0013 | 0.0013 | 0.0013 |
| Siloxane** | 6.56 | 5.72 | 3.92 | 3.2 | 2.72 | 6.7 | 5.8 | 4.0 | 3.4 |

*OC colorant mixture consisting of 0.0510 Solvent Yellow 93, 0.0001 Solvent Blue 104, 0.0291 Solvent Red 52, and 0.0309 Solvent Green 7.
**Total siloxane loading from siloxane content of PCPS1 and PCPS2.

A comparison of the physical properties for the compositions described above in Table 6 are shown below in Table 7.

TABLE 7

| Test[1] | BK-6 | BK-7 | BK-8 | BK-9 | BK-10 | BK-11 | BK-12 | BK-13 | BK-14 |
|---|---|---|---|---|---|---|---|---|---|
| Deep Black Color Capability (L*) | 27.0 | 27.6 | 28.2 | 29.1 | 29.0 | 27.2 | 27.8 | 29.1 | 29.5 |
| Melt flow (MVR) | 8.69 | 9.02 | 9.02 | 9.81 | 8.85 | 8.58 | 8.66 | 8.86 | 8.79 |
| NII (23° C.) | 722 | 819 | 850 | 875 | 893 | 710 | 773 | 850 | 883 |
| Ductility (23° C.) | 100 | 100 | 100 | 100 | 100 | 100 | 100 | 100 | 100 |
| NII (0° C.) | 689 | 770 | 834 | 837 | 870 | 669 | 734 | 805 | 846 |
| Ductility (0° C.) | 100 | 100 | 100 | 100 | 100 | 100 | 100 | 100 | 100 |
| NII (−10° C.) | 656 | 740 | 789 | 808 | 853 | 656 | 699 | 788 | 814 |
| Ductility (−10° C.) | 100 | 100 | 100 | 100 | 100 | 100 | 100 | 100 | 100 |
| NII (−20° C.) | 644 | 748 | 788 | 799 | 818 | 664 | 694 | 782 | 797 |
| Ductility (−20° C.) | 100 | 80 | 100 | 100 | 100 | 100 | 100 | 100 | 100 |
| NII (−30° C.) | 610 | 715 | 754 | 765 | 782 | 615 | 670 | 752 | 788 |
| Ductility (−30° C.) | 80 | 100 | 100 | 100 | 100 | 80 | 100 | 100 | 100 |
| NII (−40° C.) | 511 | 560 | 25 | 214 | 208 | 528 | 561 | 613 | 482 |
| Ductility (−40° C.) | 100 | 100 | 0 | 0 | 0 | 100 | 100 | 100 | 40 |

[1]See Table 3 for description of tests, conditions of testing, and units associated with values except that melt volume rate (MVR) is used here, which was measured in accordance with ISO 1133 at a temperature of 300° C. under a 1.2 kg load at 360 second dwell and the values are provided in cm$^3$/10 min.

The results listed in Table 7 show that compositions comprising about 4.0 wt % PCPS2 loading (BK-6 to BK-10) and at about 5.0 wt % PCPS2 loading (BK-11 to BK-14) have 80-100% ductility at −30° C. Deep black colors (L*<28.0) are only achieved at these PCPS2 loadings (4.0-5.0 wt %) when greater than about 50 wt % of PCPS1 is present in the composition (BK-6, BK-7. BK-8, BK-11 and BK-12). In contrast, the compositions comprising less than about 50 wt % of PCPS1 (BK-9, BK-10, BK-13 and BK-14) are not capable of achieving a deep black color (L*<28.0).

Set forth below are some embodiments of the compositions and articles disclosed herein.

Embodiment 1

A polycarbonate blend composition comprising: a polycarbonate polymer; a first polysiloxane-polycarbonate copolymer comprising:
i. polydiorganosiloxane blocks comprising repeating structural units of formula:

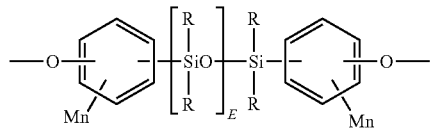

wherein the polydiorganosiloxane block length (E) is from 30 to 60; and
ii. polycarbonate blocks comprising polycarbonate units of formula:

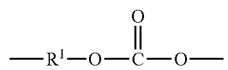

wherein at least 60 percent of the total number of $R^1$ groups comprise aromatic moieties and the balance thereof comprise aliphatic, alicyclic, or aromatic moieties;
wherein the first polysiloxane-polycarbonate copolymer comprises a diorganosiloxane content of from 4 to 8 wt % diorganosiloxane based on the total weight of the first polysiloxane-polycarbonate copolymer;
b. a second polysiloxane-polycarbonate copolymer comprising:
i. polydiorganosiloxane blocks comprising repeating structural units of formula:

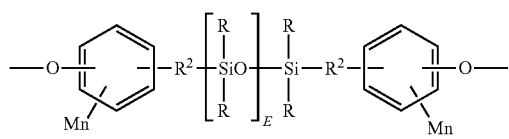

wherein the polydiorganosiloxane block length (E) is from 30 to 100; and
ii. polycarbonate blocks comprising polycarbonate units of formula:

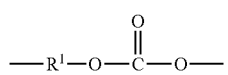

wherein at least 60 percent of the total number of $R^1$ groups comprise aromatic moieties and the balance thereof comprise aliphatic, alicyclic, or aromatic moieties;
wherein the second polysiloxane-polycarbonate copolymer comprises a diorganosiloxane content of from 15 to 30 wt % diorganosiloxane based on the total weight of the second polysiloxane-polycarbonate copolymer; and
c. a colorant composition;
wherein the blend composition has an average melt flow rate (MFR) of 7 or greater measured at 300° C./1.2 kg; and
wherein a molded part having a thickness of 3.2 mm formed from the blend composition has a black color characterized by an average L* value of 27 or less as measured by the CIE Lab method, 10 degree observer, D65 illuminant, specular component included, measured in reflectance mode; and
wherein a molded part having a thickness of 3.2 mm formed from the blend composition has an average notched Izod impact energy at −30° C. of 650 J/m or greater and a % ductility of 100% according to ASTM D256-2010; and
wherein R is the same or different, and is a $C_{1-13}$ monovalent organic group; $R^2$ is independently a divalent $C_1$-$C_{30}$ organic group; M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

Embodiment 2

The composition of Embodiment 1, wherein a molded part having a thickness of 3.2 mm formed from the blend composition has an average notched Izod energy at −40° C. of 700 J/m or greater and a % ductility of 100% according to ASTM D256-2010.

Embodiment 3

The composition of Embodiments 1 or 2, wherein the colorant composition comprises less than 1.5 wt % of an inorganic colorant based on the total weight of the colorant composition.

Embodiment 4

The composition of any of Embodiments 1-3, wherein a molded part having a thickness of 3.2 mm formed from the blend composition has an average notched Izod energy at −50° C. of 700 J/m or greater and a % ductility of 100% according to ASTM D256-2010.

Embodiment 5

The composition of any of Embodiments 1-4, wherein the second polysiloxane-polycarbonate copolymer is present in the blend composition in an amount of about 2.5 wt % relative to the total weight percent of the polycarbonate polymer, first polysiloxane-polycarbonate copolymer, and second polysiloxane-polycarbonate copolymer.

Embodiment 6

The composition of any of Embodiment 1-5, wherein the polycarbonate polymer is present in an amount in the range of from 15 wt % to 30 wt % relative to the total weight percent of the polycarbonate polymer, first polysiloxane-polycarbonate copolymer, and second polysiloxane-polycarbonate copolymer.

Embodiment 7

The composition of any of Embodiment 1-5, wherein the polycarbonate polymer is present in an amount in the range of from 22 wt % to 29 wt % relative to the total weight percent of the polycarbonate polymer, first polysiloxane-polycarbonate copolymer, and second polysiloxane-polycarbonate copolymer.

Embodiment 8

The composition of any of Embodiments 1-7, wherein the polycarbonate polymer comprises a blend of at least two polycarbonate polymers.

Embodiment 9

The composition of Embodiment 8, wherein the polycarbonate polymer comprises a first polycarbonate polymer and a second polycarbonate polymer.

Embodiment 10

The composition of Embodiment 9, wherein the first polycarbonate polymer is a low flow polycarbonate.

Embodiment 11

The composition of Embodiment 8 or 9, wherein the second polycarbonate polymer is a high flow polycarbonate.

Embodiment 12

The composition of Embodiment 9-11, wherein the first polycarbonate polymer is present in an amount in the range of from 11 wt % to 29 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 8 wt % relative to the total weight percent of the polycarbonate polymer, first polysiloxane-polycarbonate copolymer, and second polysiloxane-polycarbonate copolymer.

Embodiment 13

The composition of Embodiment 9-11, wherein the first polycarbonate polymer is present in an amount in the range of from 14 wt % to 29 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 8 wt % relative to the total weight percent of the polycarbonate polymer, first polysiloxane-polycarbonate copolymer, and second polysiloxane-polycarbonate copolymer.

Embodiment 14

The composition of any of Embodiments 1-13, wherein the total combined weight percent of the first and second polysiloxane-polycarbonate copolymers present in the blend composition is in the range of from 70 wt % to 80 wt % relative to the total combined weight percent of the polycarbonate polymer, first polysiloxane-polycarbonate copolymer, and second polysiloxane-polycarbonate copolymer.

Embodiment 15

The composition of any of Embodiments 1-14, wherein the first polysiloxane-polycarbonate copolymer is present in an amount in the range of from 65 wt % to 75 wt % relative to the total combined weight percent of the polycarbonate polymer, first polysiloxane-polycarbonate copolymer, and second polysiloxane-polycarbonate copolymer.

Embodiment 16

The composition of any of Embodiments 1-15, wherein the second polysiloxane-polycarbonate copolymer is present in an amount in the range of from greater than 0 wt % to 5 wt % relative to the total combined weight percent of the polycarbonate polymer, first polysiloxane-polycarbonate copolymer, and second polysiloxane-polycarbonate copolymer.

Embodiment 17

The composition of any of Embodiments 1-16, wherein the total weight percentage of siloxane ranges from 4.5 wt % to 5.5 wt % based on the total combined weight of the first polysiloxane-polycarbonate, second polysiloxane-polycarbonate, and the polycarbonate.

Embodiment 18

The composition of any of Embodiments 1-17, wherein the absence of colorants, the percent light transmission ranges from 73 to 85% and the percent haze ranges from 2 to 12%, when the thickness is 3.2 mm.

Embodiment 19

A polycarbonate blend composition comprising:
d. a first polysiloxane-polycarbonate copolymer comprising:
  i. polydiorganosiloxane blocks comprising repeating structural units of formula:

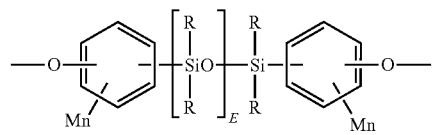

wherein the polydiorganosiloxane block length (E) is from 30 to 60; and
  ii. polycarbonate blocks comprising polycarbonate units of formula:

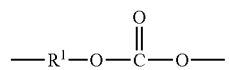

wherein at least 60 percent of the total number of $R^1$ groups comprise aromatic moieties and the balance thereof comprise aliphatic, alicyclic, or aromatic moieties;

wherein the first polysiloxane-polycarbonate copolymer comprises a diorganosiloxane content of from 4 to 8 wt % diorganosiloxane based on the total weight of the first polysiloxane-polycarbonate copolymer;

e. a second polysiloxane-polycarbonate copolymer comprising:

i. polydiorganosiloxane blocks comprising repeating structural units of formula:

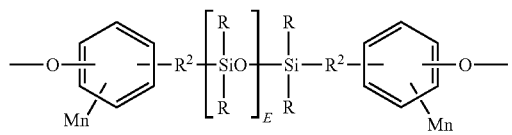

wherein the polydiorganosiloxane block length (E) is from 30 to 100; and ii. polycarbonate blocks comprising polycarbonate units of formula:

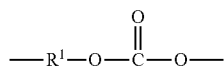

wherein at least 60 percent of the total number of $R^1$ groups comprise aromatic moieties and the balance thereof comprise aliphatic, alicyclic, or aromatic moieties;

wherein the second polysiloxane-polycarbonate copolymer comprises a diorganosiloxane content of from 15 to 30 wt % diorganosiloxane based on the total weight of the second polysiloxane-polycarbonate copolymer; and f. a colorant composition;

wherein the blend composition has an average melt flow rate (MFR) of 7 or greater measured at 300° C./1.2 kg; and wherein a molded part having a thickness of 3.2 mm formed from the blend composition has a black color characterized by an average L* value of 28 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 600 J/m or greater and a % ductility of 80% according to ASTM D256-2010; and wherein R is the same or different, and is a $C_{1\text{-}13}$ monovalent organic group; $R^2$ is independently a divalent $C_1$-$C_{30}$ organic group; M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

Embodiment 20

A polycarbonate blend composition comprising:

g. a polycarbonate polymer;

h. a first polysiloxane-polycarbonate copolymer comprising:

i. polydiorganosiloxane blocks comprising repeating structural units of formula:

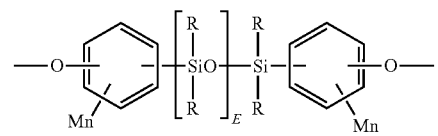

wherein the polydiorganosiloxane block length (E) is from 30 to 60; and ii. polycarbonate blocks comprising polycarbonate units of formula:

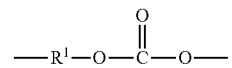

wherein at least 60 percent of the total number of $R^1$ groups comprise aromatic moieties and the balance thereof comprise aliphatic, alicyclic, or aromatic moieties;

wherein the first polysiloxane-polycarbonate copolymer comprises a diorganosiloxane content of from 4 to 8 wt % diorganosiloxane based on the total weight of the first polysiloxane-polycarbonate copolymer;

i. a second polysiloxane-polycarbonate copolymer comprising:

i. polydiorganosiloxane blocks comprising repeating structural units of formula:

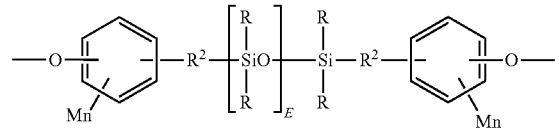

wherein the polydiorganosiloxane block length (E) is from 30 to 100; and ii. polycarbonate blocks comprising polycarbonate units of formula:

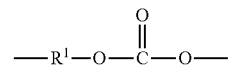

wherein at least 60 percent of the total number of $R^1$ groups comprise aromatic moieties and the balance thereof comprise aliphatic, alicyclic, or aromatic moieties;

wherein the second polysiloxane-polycarbonate copolymer comprises a diorganosiloxane content of from 15 to 30 wt % diorganosiloxane based on the total weight of the second polysiloxane-polycarbonate copolymer; and j. a colorant composition;

wherein the blend composition has an average melt flow rate (MFR) of 7 or greater measured at 300° C./1.2 kg; and wherein a molded part having a thickness of 3.2 mm formed from the blend composition has a black color characterized by an average L* value of 28 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 600 J/m or greater and a % ductility of 80% according to ASTM D256-2010; and wherein R is the same or different, and is a $C_{1-13}$ monovalent organic group; $R^2$ is independently a divalent $C_1$-$C_{30}$ organic group; M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

Embodiment 21

The composition of Embodiments 19 or 20, wherein the colorant composition comprises less than 12 wt % of an inorganic colorant based on the total weight of the colorant composition.

Embodiment 22

The composition of any of Embodiments 19-21, wherein a molded part having a thickness of 3.2 mm formed from the blend composition has an average notched Izod energy at −40° C. of 500 J/m or greater and a % ductility of 100% according to ASTM D256-2010.

Embodiment 23

The composition of any of Embodiments 19-22, wherein a molded part having a thickness of 3.2 mm formed from the blend composition has an average notched Izod energy at −50° C. of 500 J/m or greater and a % ductility of 80% according to ASTM D256-2010.

Embodiment 24

The composition of any of Embodiments 20-23, wherein the polycarbonate polymer is present in an amount in the range of from 0 wt % to 55 wt % relative to the total weight percent of the polycarbonate polymer, first polysiloxane-polycarbonate copolymer, and second polysiloxane-polycarbonate copolymer.

Embodiment 25

The composition of any of Embodiments 20-24, wherein the polycarbonate polymer is present in an amount in the range of from 0 wt % to 45 wt % relative to the total weight percent of the polycarbonate polymer, first polysiloxane-polycarbonate copolymer, and second polysiloxane-polycarbonate copolymer.

Embodiment 26

The composition of any of Embodiments 20-25, wherein the polycarbonate polymer comprises a blend of at least two polycarbonate polymers.

Embodiment 27

The composition of Embodiment 26, wherein the polycarbonate polymer comprises a first polycarbonate polymer and a second polycarbonate polymer.

Embodiment 28

The composition of Embodiment 27, wherein the first polycarbonate polymer is a low flow polycarbonate.

Embodiment 29

The composition of Embodiment 27 or 28, wherein the second polycarbonate polymer is a high flow polycarbonate.

Embodiment 30

The composition of any of Embodiments 27-29, wherein the first polycarbonate polymer is present in an amount in the range of from 10 wt % to 30 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 15 wt % relative to the total weight percent of the polycarbonate polymer, first polysiloxane-polycarbonate copolymer, and second polysiloxane-polycarbonate copolymer.

Embodiment 31

The composition of any of Embodiments 19-30, wherein the total combined weight percent of the first and second polysiloxane-polycarbonate copolymers present in the blend composition is in the range of from 54 wt % to 100 wt % relative to the total combined weight percent of the polycarbonate polymer, first polysiloxane-polycarbonate copolymer, and second polysiloxane-polycarbonate copolymer.

Embodiment 32

The composition of any of Embodiments 19-31, wherein the first polysiloxane-polycarbonate copolymer is present in an amount in the range of from 50 wt % to 95 wt % relative to the total combined weight percent of the polycarbonate polymer, first polysiloxane-polycarbonate copolymer, and second polysiloxane-polycarbonate copolymer.

Embodiment 33

The composition of any of Embodiments 19-32, wherein the second polysiloxane-polycarbonate copolymer is present in an amount in the range of from greater than 0 wt % to 5 wt % relative to the total combined weight percent of the polycarbonate polymer, first polysiloxane-polycarbonate copolymer, and second polysiloxane-polycarbonate copolymer.

Embodiment 34

The composition of any of Embodiments 19-33, wherein the total weight percentage of siloxane ranges from 4.0 wt % to 7 wt % based on the total combined weight of the first polysiloxane-polycarbonate, second polysiloxane-polycarbonate, and the polycarbonate.

Embodiment 35

The composition of any of Embodiments 19-34, wherein the absence of colorants, the percent light transmission ranges from 65 to 85% and the percent haze ranges from 2 to 25%, when the thickness is 3.2 mm.

Embodiment 36

The composition of any of Embodiments 19-35, wherein the second polysiloxane-polycarbonate copolymer is present in the blend composition in an amount of about 4 wt % relative to the total weight percent of the polycarbonate polymer, first polysiloxane-polycarbonate copolymer, and second polysiloxane-polycarbonate copolymer.

Embodiment 37

The composition of any of Embodiments 1-36, wherein the second polysiloxane-polycarbonate copolymer is present in the blend composition in an amount less than 5 wt % relative to the total weight percent of the polycarbonate polymer, first polysiloxane-polycarbonate copolymer, and second polysiloxane-polycarbonate copolymer.

Embodiment 38

The composition of any of Embodiments 1-37, wherein the first polysiloxane-polycarbonate copolymer has an weight-averaged molecular weight, Mw, in the range of from 20,000 to 25,000 and wherein an injection molded part having a thickness of 3.2 mm formed from the blend composition has an average haze of less than 2.5% measured according to ASTM D1003.

Embodiment 39

The composition of any of Embodiments 1-38, wherein the second polysiloxane-polycarbonate copolymer has a weight-averaged molecular weight, Mw, in the range of from 25,000 to 35,000.

Embodiment 40

The composition of any of Embodiments 1-18 and 20-39, wherein the polycarbonate polymer is a Bisphenol-A-polycarbonate.

Embodiment 41

The composition of Embodiment 40, wherein the Bisphenol-A polycarbonate has a weight-averaged molecular weight between 18,000 and 32,000.

Embodiment 42

The composition of Embodiment 40, wherein the Bisphenol-A polycarbonate has a weight-averaged molecular weight between 28,000 and 32,000.

Embodiment 43

The composition of any of Embodiments 1-42, wherein the siloxane units of the first and second polysiloxane polycarbonate copolymers are dimethylsiloxane units.

Embodiment 44

The composition of any of Embodiments 1-43, wherein the polydiorganosiloxane has moieties derived from eugenol, 4-allylphenol or 2-allylphenol.

Embodiment 45

The composition of any of Embodiments 1-44, wherein the colorant composition comprises carbon black in an amount less than 1.5 wt % of the total colorant composition.

Embodiment 46

The composition of any of Embodiments 1-45, wherein the PDI of the first polysiloxane-polycarbonate and the second polysiloxane-polycarbonate ranges from 2 to 3.

Embodiment 47

The composition of any of Embodiments 1-46, wherein the first polysiloxane-polycarbonate and the second polysiloxane-polycarbonate comprise a polycarbonate unit derived from bisphenol-A.

Embodiment 48

An article of manufacture formed from the blend composition of any of Embodiments 1-47.

Embodiment 49

The article of manufacture of Embodiment 48, wherein the thickness of the article is less than 1.5 mm.

Embodiment 50

The article of manufacture of Embodiment 48, wherein the thickness of the article is less than 1.5 mm in at least a portion of the article.

Embodiment 51

The article of manufacture of any of Embodiments 48-50, wherein the article is an injection molded part.

Embodiment 52

The article of manufacture of any of Embodiments 48-50, wherein the article is an extruded film or sheet.

Embodiment 53

The article of manufacture of any Embodiments 48-50, wherein the article is a component for an electronic device.

Embodiment 54

The article of manufacture of Embodiment 53, wherein the electronic device is selected from a gaming system, a cell phone, a smart phone, a GPS device, a laptop computer, a tablet computer, an e-reader, or a copier.

Embodiment 55

The article of manufacture of any of Embodiments 48-50, wherein the article is a component for a sports goggle or an eyeglass frame.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A polycarbonate blend composition comprising:
a. a polycarbonate polymer;
b. a first polysiloxane-polycarbonate copolymer comprising:
   i. polydiorganosiloxane blocks comprising repeating structural units of formula:

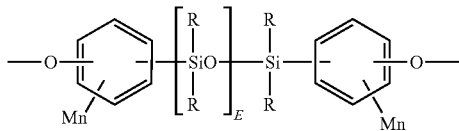

wherein the polydiorganosiloxane block length (E) is from 30 to 60; and
   ii. polycarbonate blocks comprising polycarbonate units of formula:

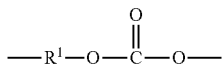

wherein at least 60 percent of the total number of $R^1$ groups comprise aromatic moieties and the balance thereof comprise aliphatic, alicyclic, or aromatic moieties;
wherein the first polysiloxane-polycarbonate copolymer comprises a diorganosiloxane content of from 4 to 8 wt % diorganosiloxane based on the total weight of the first polysiloxane-polycarbonate copolymer;

c. a second polysiloxane-polycarbonate copolymer comprising:
   i. polydiorganosiloxane blocks comprising repeating structural units of formula:

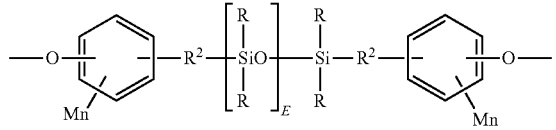

wherein the polydiorganosiloxane block length (E) is from 30 to 100; and
   ii. polycarbonate blocks comprising polycarbonate units of formula:

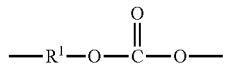

wherein at least 60 percent of the total number of $R^1$ groups comprise aromatic moieties and the balance thereof comprise aliphatic, alicyclic, or aromatic moieties;
wherein the second polysiloxane-polycarbonate copolymer comprises a diorganosiloxane content of from 15 to 30 wt % diorganosiloxane based on the total weight of the second polysiloxane-polycarbonate copolymer; and d. a colorant composition;
wherein the blend composition has an average melt flow rate (MFR) of 7 or greater measured at 300° C./1.2 kg; and
wherein a molded part having a thickness of 3.2 mm formed from the blend composition has a black color characterized by an average L* value of 27 or less as measured by the CIE Lab method, 10 degree observer, D65 illuminant, specular component included, measured in reflectance mode; and
wherein a molded part having a thickness of 3.2 mm formed from the blend composition has an average notched Izod impact energy at −30° C. of 650 J/m or greater according to ASTM D256-2010 and a % ductility at −30° C. of 100%; and
wherein R is the same or different, and is a $C_{1-13}$ monovalent organic group; $R^2$ is independently a divalent $C_1$-$C_{30}$ organic group; M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

2. The composition of claim 1, wherein the colorant composition comprises less than 1.5 wt % of an inorganic colorant based on the total weight of the colorant composition.

3. The composition of claim 1, wherein the second polysiloxane-polycarbonate copolymer is present in the blend composition in an amount of about 2.5 wt % relative to the total weight percent of the polycarbonate polymer, first polysiloxane-polycarbonate copolymer, and second polysiloxane-polycarbonate copolymer.

4. The composition of claim 1, wherein the polycarbonate polymer is present in an amount in the range of from 15 wt % to 30 wt % relative to the total weight percent of the polycarbonate polymer, first polysiloxane-polycarbonate copolymer, and second polysiloxane-polycarbonate copolymer.

5. The composition of claim 1, wherein the polycarbonate polymer is present in an amount in the range of from 22 wt % to 29 wt % relative to the total weight percent of the polycarbonate polymer, first polysiloxane-polycarbonate copolymer, and second polysiloxane-polycarbonate copolymer.

6. The composition of claim 1, wherein the total combined weight percent of the first and second polysiloxane-polycarbonate copolymers present in the blend composition is in the range of from 70 wt % to 80 wt % relative to the total combined weight percent of the polycarbonate polymer, first polysiloxane-polycarbonate copolymer, and second polysiloxane-polycarbonate copolymer; and/or
wherein the first polysiloxane-polycarbonate copolymer is present in an amount in the range of from 65 wt % to 75 wt % relative to the total combined weight percent of the polycarbonate polymer, first polysiloxane-polycarbonate copolymer, and second polysiloxane-polycarbonate copolymer.

7. The composition of claim 1, wherein the second polysiloxane-polycarbonate copolymer is present in an amount in the range of from greater than 0 wt % to 5 wt % relative to the total combined weight percent of the polycarbonate polymer, first polysiloxane-polycarbonate copolymer, and second polysiloxane-polycarbonate copolymer.

8. The composition of claim 1, wherein the total weight percentage of siloxane ranges from 4.5 wt % to 5.5 wt % based on the total combined weight of the first polysiloxane-polycarbonate, second polysiloxane-polycarbonate, and the polycarbonate.

9. The composition of claim 1, wherein the second polysiloxane-polycarbonate copolymer has a weight-averaged molecular weight, Mw, in the range of from 25,000 to 35,000, wherein the polycarbonate polymer is a Bisphenol-A-polycarbonate, wherein the siloxane units of the first and second polysiloxane polycarbonate copolymers are dimethylsiloxane units, wherein the polydiorganosiloxane has moieties derived from eugenol, 4-allylphenol or 2-allylphenol, wherein the PDI of the first polysiloxane-polycarbonate and the second polysiloxane-polycarbonate ranges from 2 to 3.

10. The composition of claim 1, wherein the polycarbonate polymer comprises a blend of at least two polycarbonate polymers, wherein the polycarbonate polymer comprises a first polycarbonate polymer and a second polycarbonate polymer, wherein the first polycarbonate polymer is a low flow polycarbonate, and wherein the second polycarbonate polymer is a high flow polycarbonate.

11. The composition of claim 10, wherein the first polycarbonate polymer is present in an amount in the range of from 11 wt % to 29 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 8 wt % relative to the total weight percent of the polycarbonate polymer, first polysiloxane-polycarbonate copolymer, and second polysiloxane-polycarbonate copolymer.

12. The composition of claim 10, wherein the first polycarbonate polymer is present in an amount in the range of from 14 wt % to 29 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 8 wt % relative to the total weight percent of the polycarbonate polymer, first polysiloxane-polycarbonate copolymer, and second polysiloxane-polycarbonate copolymer.

13. An article of manufacture formed from the blend composition of claim 1.

14. The article of manufacture of claim 13, wherein the article is a component for an electronic device, a sports goggle or an eyeglass frame, and wherein the thickness of the article is less than 1.5 mm in at least a portion of the article.

15. A polycarbonate blend composition comprising:
a. a first polysiloxane-polycarbonate copolymer comprising:
i. polydiorganosiloxane blocks comprising repeating structural units of formula:

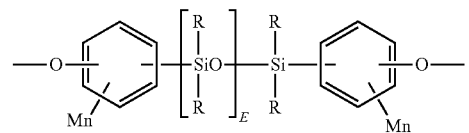

wherein the polydiorganosiloxane block length (E) is from 30 to 60; and
ii. polycarbonate blocks comprising polycarbonate units of formula:

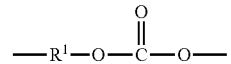

wherein at least 60 percent of the total number of $R^1$ groups comprise aromatic moieties and the balance thereof comprise aliphatic, alicyclic, or aromatic moieties;
wherein the first polysiloxane-polycarbonate copolymer comprises a diorganosiloxane content of from 4 to 8 wt % diorganosiloxane based on the total weight of the first polysiloxane-polycarbonate copolymer;
b. a second polysiloxane-polycarbonate copolymer comprising:
i. polydiorganosiloxane blocks comprising repeating structural units of formula:

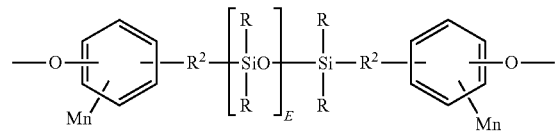

wherein the polydiorganosiloxane block length (E) is from 30 to 100; and
ii. polycarbonate blocks comprising polycarbonate units of formula:

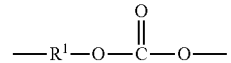

wherein at least 60 percent of the total number of $R^1$ groups comprise aromatic moieties and the balance thereof comprise aliphatic, alicyclic, or aromatic moieties;

wherein the second polysiloxane-polycarbonate copolymer comprises a diorganosiloxane content of from 15 to 30 wt % diorganosiloxane based on the total weight of the second polysiloxane-polycarbonate copolymer; and c. a colorant composition;

wherein the blend composition has an average melt flow rate (MFR) of 7 or greater measured at 300° C./1.2 kg; and wherein a molded part having a thickness of 3.2 mm formed from the blend composition has a black color characterized by an average L* value of 28 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 600 J/m or greater according to ASTM D256-2010 and a % ductility at −30° C. of 80%; and wherein R is the same or different, and is a $C_{1-13}$ monovalent organic group; $R^2$ is independently a divalent $C_1$-$C_{30}$ organic group; M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

16. The composition of claim 15, wherein the first polysiloxane-polycarbonate copolymer is present in an amount in the range of from 50 wt % to 95 wt % relative to the total combined weight percent of the polycarbonate polymer, first polysiloxane-polycarbonate copolymer, and second polysiloxane-polycarbonate copolymer, and wherein the second polysiloxane-polycarbonate copolymer is present in an amount in the range of from greater than 0 wt % to 5 wt % relative to the total combined weight percent of the polycarbonate polymer, first polysiloxane-polycarbonate copolymer, and second polysiloxane-polycarbonate copolymer.

17. The composition of claim 15, wherein the total weight percentage of siloxane ranges from 4.0 wt % to 7 wt % based on the total combined weight of the first polysiloxane-polycarbonate, second polysiloxane-polycarbonate, and the polycarbonate.

18. The composition of claim 15, wherein the second polysiloxane-polycarbonate copolymer is present in the blend composition in an amount less than 5 wt % relative to the total weight percent of the polycarbonate polymer, first polysiloxane-polycarbonate copolymer, and second polysiloxane-polycarbonate copolymer.

19. A polycarbonate blend composition comprising:
a. a polycarbonate polymer;
b. a first polysiloxane-polycarbonate copolymer comprising:
i. polydiorganosiloxane blocks comprising repeating structural units of formula:

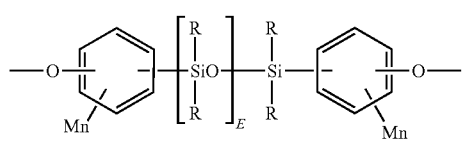

wherein the polydiorganosiloxane block length (E) is from 30 to 60; and
ii. polycarbonate blocks comprising polycarbonate units of formula:

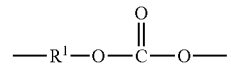

wherein at least 60 percent of the total number of $R^1$ groups comprise aromatic moieties and the balance thereof comprise aliphatic, alicyclic, or aromatic moieties;

wherein the first polysiloxane-polycarbonate copolymer comprises a diorganosiloxane content of from 4 to 8 wt % diorganosiloxane based on the total weight of the first polysiloxane-polycarbonate copolymer;

c. a second polysiloxane-polycarbonate copolymer comprising:
i. polydiorganosiloxane blocks comprising repeating structural units of formula:

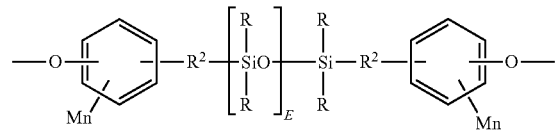

wherein the polydiorganosiloxane block length (E) is from 30 to 100; and
ii. polycarbonate blocks comprising polycarbonate units of formula:

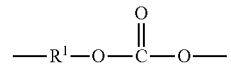

wherein at least 60 percent of the total number of $R^1$ groups comprise aromatic moieties and the balance thereof comprise aliphatic, alicyclic, or aromatic moieties;

wherein the second polysiloxane-polycarbonate copolymer comprises a diorganosiloxane content of from 15 to 30 wt % diorganosiloxane based on the total weight of the second polysiloxane-polycarbonate copolymer; and d. a colorant composition;

wherein the blend composition has an average melt flow rate (MFR) of 7 or greater measured at 300° C./1.2 kg; and wherein a molded part having a thickness of 3.2 mm formed from the blend composition has a black color characterized by an average L* value of 28 or less as measured by the CIE Lab method, 10 degree observer, D65 illuminant, specular component included, measured in reflectance mode; and wherein a molded part having a thickness of 3.2 mm formed from the blend composition has an average notched Izod impact energy at −30° C. of 600 J/m or greater according to ASTM D256-2010 and a % ductility at −30° C. of 80%; and wherein R is the same or different, and is a $C_{1-13}$ monovalent organic group; $R^2$ is independently a divalent $C_1$-$C_{30}$ organic group; M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

20. The composition of claim 19, wherein the polycarbonate polymer comprises a first polycarbonate polymer and a second polycarbonate polymer and wherein the first polycarbonate polymer is present in an amount in the range of from 10 wt % to 30 wt % relative to the total weight percent of the polycarbonate polymer, first polysiloxane-polycarbonate copolymer, and second polysiloxane-polycarbonate copolymer and wherein the second polycarbonate polymer is present in an amount in the range of from greater than 0 wt % to 15 wt % relative to the total weight percent of the polycarbonate polymer, first polysiloxane-polycarbonate copolymer, and second polysiloxane-polycarbonate copolymer; and wherein the total combined weight percent of the first and second polysiloxane-polycarbonate copolymers present in the blend composition is in the range of from 54 wt % to 100 wt % relative to the total combined weight percent of the polycarbonate polymer, first polysiloxane-polycarbonate copolymer, and second polysiloxane-polycarbonate copolymer.

* * * * *